(12) United States Patent
Zhang et al.

(10) Patent No.: US 12,471,171 B2
(45) Date of Patent: Nov. 11, 2025

(54) RRC LAYER BASED SUSPEND AND RESUME FOR MULTI-SIM UE

(71) Applicant: QUALCOMM Incorporated, San Diego, CA (US)

(72) Inventors: Juan Zhang, Beijing (CN); Ozcan Ozturk, San Diego, CA (US); Gavin Bernard Horn, La Jolla, CA (US); Haris Zisimopoulos, London (GB)

(73) Assignee: QUALCOMM Incorporated, San Diego, CA (US)

( * ) Notice: Subject to any disclaimer, the term of this patent is extended or adjusted under 35 U.S.C. 154(b) by 472 days.

(21) Appl. No.: 17/596,867

(22) PCT Filed: Jul. 15, 2019

(86) PCT No.: PCT/CN2019/095928
§ 371 (c)(1),
(2) Date: Dec. 20, 2021

(87) PCT Pub. No.: WO2021/007735
PCT Pub. Date: Jan. 21, 2021

(65) Prior Publication Data
US 2022/0312538 A1 Sep. 29, 2022

(51) Int. Cl.
*H04W 76/27* (2018.01)
*H04W 8/18* (2009.01)
(Continued)

(52) U.S. Cl.
CPC .......... *H04W 76/27* (2018.02); *H04W 8/183* (2013.01); *H04W 68/005* (2013.01);
(Continued)

(58) Field of Classification Search
CPC ..... H04W 76/27; H04W 76/30; H04W 76/10; H04W 76/00; H04W 8/183;
(Continued)

(56) References Cited

U.S. PATENT DOCUMENTS 8,874,167 B2 * 10/2014 Qiu ................. H04W 48/18
710/64
9,066,330 B2 6/2015 Hang et al.
(Continued)

FOREIGN PATENT DOCUMENTS

CN 102843782 A * 12/2012 ........ H04W 72/1215
CN 105519165 A 4/2016
(Continued)

OTHER PUBLICATIONS

International Search Report and Written Opinion—PCT/CN2019/095928—ISA/EPO—Apr. 16, 2020.
(Continued)

*Primary Examiner* — Shean Tokuta
(74) *Attorney, Agent, or Firm* — Guang Y. Zhang; Harrity & Harrity, LLP

(57) ABSTRACT

Various aspects of the present disclosure generally relate to wireless communication. In some aspects, a user equipment may transmit, to a first radio access network (RAN) node associated with a first subscription, a request to suspend downlink transmissions related to the first subscription based at least in part on a paging request received from a second RAN node associated with a second subscription. The UE may receive, from the first RAN node, a release message indicating that one or more core network nodes associated with the first subscription have suspended the downlink transmissions related to the first subscription. Accordingly, the UE may enter an inactive mode on a first wireless network associated with the first subscription and enter a connected mode on a second wireless network associated with the second subscription based at least in part on the release message. Numerous other aspects are provided.

25 Claims, 14 Drawing Sheets

(51) Int. Cl.
*H04W 28/02* (2009.01)
*H04W 68/00* (2009.01)
*H04W 76/30* (2018.01)
*H04W 88/06* (2009.01)

(52) U.S. Cl.
CPC ........ *H04W 76/30* (2018.02); *H04W 28/0268* (2013.01); *H04W 88/06* (2013.01)

(58) Field of Classification Search
CPC ........... H04W 68/005; H04W 28/0268; H04W 88/06; H04W 36/0069; H04W 12/45
See application file for complete search history.

(56) References Cited

U.S. PATENT DOCUMENTS

| | | | |
|---|---|---|---|
| 10,440,091 B2 * | 10/2019 | Ban | H04L 67/02 |
| 12,167,311 B2 * | 12/2024 | Ke | H04W 4/90 |
| 2012/0236709 A1 * | 9/2012 | Ramachandran | H04W 76/18 370/221 |
| 2013/0150014 A1 * | 6/2013 | Gong | H04W 48/18 455/418 |
| 2013/0150126 A1 * | 6/2013 | Pattaswamy | H04W 8/183 455/558 |
| 2014/0073365 A1 * | 3/2014 | Goyal | H04W 4/14 455/458 |
| 2014/0295831 A1 * | 10/2014 | Karra | H04W 68/005 455/434 |
| 2016/0007370 A1 * | 1/2016 | Kotreka | H04W 88/06 370/329 |
| 2016/0044178 A1 * | 2/2016 | Narayanaswamy | H04W 4/16 455/417 |
| 2016/0112084 A1 * | 4/2016 | Parron | H04L 47/245 455/558 |
| 2016/0134316 A1 * | 5/2016 | Mohan | H04B 1/3816 455/558 |
| 2016/0142998 A1 * | 5/2016 | Tsai | H04W 48/20 455/458 |
| 2016/0301790 A1 * | 10/2016 | Kanamarlapudi | H04W 8/183 |
| 2017/0332372 A1 * | 11/2017 | Lee | H04W 72/542 |
| 2018/0160422 A1 * | 6/2018 | Pathak | H04W 76/10 |
| 2018/0199398 A1 * | 7/2018 | Dao | H04W 76/27 |
| 2018/0279193 A1 | 9/2018 | Park et al. | |
| 2018/0279397 A1 * | 9/2018 | Faccin | H04W 28/0226 |
| 2018/0279400 A1 * | 9/2018 | Faccin | H04W 68/005 |
| 2019/0028860 A1 * | 1/2019 | Futaki | H04W 76/27 |
| 2020/0068647 A1 * | 2/2020 | Jha | H04W 60/005 |
| 2020/0304984 A1 * | 9/2020 | Dhanapal | H04W 56/001 |
| 2020/0329455 A1 * | 10/2020 | Ryu | H04W 76/28 |
| 2020/0396591 A1 * | 12/2020 | Ou | H04W 76/30 |
| 2021/0006963 A1 * | 1/2021 | Chauhan | H04L 1/0026 |
| 2021/0014934 A1 * | 1/2021 | Lovlekar | H04W 4/60 |
| 2021/0029773 A1 * | 1/2021 | Majumder | H04W 8/183 |
| 2021/0410107 A1 * | 12/2021 | Park | H04W 68/02 |
| 2022/0072175 A1 * | 3/2022 | Lovlekar | A61L 2/24 |
| 2022/0132613 A1 * | 4/2022 | Chang | H04L 5/1469 |
| 2022/0287132 A1 * | 9/2022 | Zhang | H04W 76/27 |
| 2022/0312538 A1 * | 9/2022 | Zhang | H04W 68/005 |
| 2023/0180336 A1 * | 6/2023 | Lovlekar | H04W 36/00837 370/329 |

FOREIGN PATENT DOCUMENTS

| | | | | |
|---|---|---|---|---|
| CN | 108924817 A | * | 11/2018 | |
| CN | 109246816 A | | 1/2019 | |
| CN | 109548109 A | | 3/2019 | |
| CN | 109548113 A | | 3/2019 | |
| CN | 109587677 A | | 4/2019 | |
| CN | 110012553 A | | 7/2019 | |
| CN | 112218354 A | * | 1/2021 | ............... A61L 2/10 |
| CN | 112218368 A | * | 1/2021 | ........... H04L 5/1469 |
| CN | 114128362 A | * | 3/2022 | ......... H04W 68/005 |
| EP | 2469897 A1 | * | 6/2012 | ............ H04W 8/183 |
| EP | 3016455 A1 | * | 5/2016 | ........... H04B 1/3816 |
| EP | 3300447 A1 | * | 3/2018 | |
| WO | WO-2014000650 A1 | * | 1/2014 | ........ H04W 36/0011 |
| WO | WO-2018001459 A1 | | 1/2018 | |
| WO | WO-2018028925 A1 | * | 2/2018 | ........ H04W 52/0209 |
| WO | WO-2018231007 A1 | * | 12/2018 | .............. H04W 4/02 |
| WO | WO-2019223702 A1 | * | 11/2019 | ........ H04W 36/0033 |
| WO | WO-2020155174 A1 | * | 8/2020 | |
| WO | WO-2020209641 A1 | * | 10/2020 | .......... H04W 36/142 |
| WO | WO-2021007735 A1 | * | 1/2021 | .......... H04W 68/005 |
| WO | WO-2021027836 A1 | * | 2/2021 | .............. H04W 4/16 |

OTHER PUBLICATIONS

ZTE: "Corporation CN Area Update in Inactive State," 3GPP TSG-RAN WG2 Meeting # 101bis, R2-1807320, Apr. 20, 2018 (Apr. 20, 2018), pp. 1-9.
Supplementary European Search Report—EP19937772—Search Authority—Berlin—Mar. 27, 2023.

* cited by examiner

RRC LAYER BASED SUSPEND AND RESUME FOR MULTI-SIM UE

CROSS-REFERENCE TO RELATED APPLICATION

This application is a 371 national stage of Patent Cooperation Treaty (PCT) Application No. PCT/CN2019/095928 filed on Jul. 15, 2019, entitled "RRC LAYER BASED SUSPEND AND RESUME FOR MULTI-SIM UE," which is hereby expressly incorporated by reference herein.

FIELD OF THE DISCLOSURE

Aspects of the present disclosure generally relate to wireless communication and to techniques and apparatuses for performing a radio resource control (RRC) layer based suspend and resume procedure for a user equipment having multiple subscriber identity modules (SIMs).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies.

SUMMARY

In some aspects, a method of wireless communication, performed by a user equipment (UE), may include transmitting, to a first radio access network (RAN) node associated with a first subscription, a request to suspend downlink transmissions related to the first subscription based at least in part on a paging request received from a second RAN node associated with a second subscription; receiving, from the first RAN node, a release message indicating that one or more core network nodes associated with the first subscription have suspended the downlink transmissions related to the first subscription; and entering an inactive mode on a first wireless network associated with the first subscription and entering a connected mode on a second wireless network associated with the second subscription based at least in part on the release message.

In some aspects, a method of wireless communication, performed by a RAN node, may include receiving, from a UE served by the RAN node, a request to suspend downlink transmissions related to a subscription of the UE; transmitting, to a core network node, a user plane suspend message based at least in part on the request to suspend the downlink transmissions; and transmitting, to the UE, a release message to transition the UE to an inactive mode on the RAN based at least in part on a response message from the core network node indicating that the downlink transmissions related to the subscription of the UE have been suspended.

In some aspects, a method of wireless communication, performed by an access and mobility management function (AMF) device, may include receiving, from a RAN node, a user plane suspend message for a UE served by the RAN node; forwarding information contained in the user plane suspend message to one or more session management function (SMF) devices serving the UE; and transmitting, to the RAN node, a user plane suspend response message indicating that downlink transmissions related to a subscription of the UE have been suspended based at least in part on a downlink data suspend response message received from the one or more SMF devices.

In some aspects, a method of wireless communication, performed by an SMF device, may include receiving, from an AMF device, a request to suspend downlink transmissions for a UE, wherein the request includes one or more quality of service (QoS) flow or dedicated radio bearer (DRB) identifiers to be suspended; transmitting, to a user plane function (UPF) device, an instruction to buffer or discard subsequent downlink data that relates to the one or more QoS flow or DRB identifiers based at least in part on one or more policies; and transmitting, to the AMY device, a message to indicate that the downlink transmissions have been suspended based at least in part on the UPF device acknowledging the instruction to buffer or discard the subsequent downlink data that relates to the one or more QoS flow or DRB identifiers.

In some aspects, a method of wireless communication, performed by a UPF device, may include receiving, from an SMF device, an instruction to suspend downlink transmissions related to one or more QoS flow or DRB identifiers associated with a UE; and transmitting, to the SMF device, a message acknowledging the instruction to suspend the downlink transmissions related to the one or more QoS flow or DRB identifiers associated with the UE.

In some aspects, a UE for wireless communication may include a memory and one or more processors operatively coupled to the memory. The memory and the one or more processors may be configured to transmit, to a first RAN node associated with a first subscription, a request to suspend downlink transmissions related to the first subscription based at least in part on a paging request received from a second RAN node associated with a second subscription; receive, from the first RAN node, a release message indicating that one or more core network nodes associated with the first subscription have suspended the downlink transmissions related to the first subscription; and enter an inactive mode on a first wireless network associated with the first subscription and enter a connected mode on a second wireless network associated with the second subscription based at least in part on the release message.

In some aspects, a RAN node for wireless communication may include a memory and one or more processors operatively coupled to the memory. The memory and the one or more processors may be configured to receive, from a UE served by the RAN node, a request to suspend downlink transmissions related to a subscription of the UE; transmit, to a core network node, a user plane suspend message based at least in part on the request to suspend the downlink transmissions; and transmit, to the UE, a release message to transition the UE to an inactive mode on the RAN based at least in part on a response message from the core network node indicating that the downlink transmissions related to the subscription of the UE have been suspended.

In some aspects, an AMY device for wireless communication may include a memory and one or more processors operatively coupled to the memory. The memory and the one or more processors may be configured to receive, from a RAN node, a user plane suspend message for a UE served by the RAN node; forward information contained in the user plane suspend message to one or more SMF devices serving the UE; and transmit, to the RAN node, a user plane suspend response message indicating that downlink transmissions related to a subscription of the UE have been suspended based at least in part on a downlink data suspend response message received from the one or more SMF devices.

In some aspects, an SMF device for wireless communication may include a memory and one or more processors operatively coupled to the memory. The memory and the one or more processors may be configured to receive, from an AMF device, a request to suspend downlink transmissions for a UE, wherein the request includes one or more QoS flow or DRB identifiers to be suspended; transmit, to a UPF device, an instruction to buffer or discard subsequent downlink data that relates to the one or more QoS flow or DRB identifiers based at least in part on one or more policies; and transmit, to the AMF device, a message to indicate that the downlink transmissions have been suspended based at least in part on the UPF device acknowledging the instruction to buffer or discard the subsequent downlink data that relates to the one or more QoS flow or DRB identifiers.

In some aspects, a UPF device for wireless communication may include a memory and one or more processors operatively coupled to the memory. The memory and the one or more processors may be configured to receive, from an SMF device, an instruction to suspend downlink transmissions related to one or more QoS flow or DRB identifiers associated with a UE; and transmit, to the SMF device, a message acknowledging the instruction to suspend the downlink transmissions related to the one or more QoS flow or DRB identifiers associated with the UE.

In some aspects, a non-transitory computer-readable medium may store one or more instructions for wireless communication. The one or more instructions, when executed by one or more processors of a UE, may cause the one or more processors to: transmit, to a first RAN node associated with a first subscription, a request to suspend downlink transmissions related to the first subscription based at least in part on a paging request received from a second RAN node associated with a second subscription; receive, from the first RAN node, a release message indicating that one or more core network nodes associated with the first subscription have suspended the downlink transmissions related to the first subscription; and enter an inactive mode on a first wireless network associated with the first subscription and enter a connected mode on a second wireless network associated with the second subscription based at least in part on the release message.

In some aspects, a non-transitory computer-readable medium may store one or more instructions for wireless communication. The one or more instructions, when executed by one or more processors of a RAN node, may cause the one or more processors to: receive, from a UE served by the RAN node, a request to suspend downlink transmissions related to a subscription of the UE; transmit, to a core network node, a user plane suspend message based at least in part on the request to suspend the downlink transmissions; and transmit, to the UE, a release message to transition the UE to an inactive mode on the RAN based at least in part on a response message from the core network node indicating that the downlink transmissions related to the subscription of the UE have been suspended.

In some aspects, a non-transitory computer-readable medium may store one or more instructions for wireless communication. The one or more instructions, when executed by one or more processors of an AMF device, may cause the one or more processors to: receive, from a RAN node, a user plane suspend message for a UE served by the RAN node; forward information contained in the user plane suspend message to one or more SMF devices serving the UE; and transmit, to the RAN node, a user plane suspend response message indicating that downlink transmissions related to a subscription of the UE have been suspended based at least in part on a downlink data suspend response message received from the one or more SMF devices.

In some aspects, a non-transitory computer-readable medium may store one or more instructions for wireless communication. The one or more instructions, when executed by one or more processors of an SMF device, may cause the one or more processors to: receive, from an AMF device, a request to suspend downlink transmissions for a UE, wherein the request includes one or more QoS flow or DRB identifiers to be suspended; transmit, to a UPF device, an instruction to buffer or discard subsequent downlink data that relates to the one or more QoS flow or DRB identifiers based at least in part on one or more policies; and transmit, to the AMF device, a message to indicate that the downlink transmissions have been suspended based at least in part on the UPF device acknowledging the instruction to buffer or discard the subsequent downlink data that relates to the one or more QoS flow or DRB identifiers.

In some aspects, a non-transitory computer-readable medium may store one or more instructions for wireless communication. The one or more instructions, when executed by one or more processors of a UPF device, may cause the one or more processors to: receive, from an SMF device, an instruction to suspend downlink transmissions related to one or more QoS flow or DRB identifiers associated with a UE; and transmit, to the SMF device, a message acknowledging the instruction to suspend the downlink transmissions related to the one or more QoS flow or DRB identifiers associated with the UE.

In some aspects, an apparatus for wireless communication may include means for transmitting, to a first RAN node associated with a first subscription, a request to suspend downlink transmissions related to the first subscription based at least in part on a paging request received from a second RAN node associated with a second subscription; means for receiving, from the first RAN node, a release message indicating that one or more core network nodes associated with the first subscription have suspended the downlink transmissions related to the first subscription; and means for entering an inactive mode on a first wireless network associated with the first subscription and enter a connected mode on a second wireless network associated with the second subscription based at least in part on the release message.

In some aspects, an apparatus for wireless communication may include means for receiving, from a UE served by the apparatus, a request to suspend downlink transmissions related to a subscription of the UE; means for transmitting, to a core network node, a user plane suspend message based at least in part on the request to suspend the downlink transmissions; and means for transmitting, to the UE, a release message to transition the UE to an inactive mode on a radio access network associated with the apparatus based at least in part on a response message from the core network node indicating that the downlink transmissions related to the subscription of the UE have been suspended.

In some aspects, an apparatus for wireless communication may include means for receiving, from a RAN node, a user plane suspend message for a UE served by the RAN node; means for forwarding information contained in the user plane suspend message to one or more SMF devices serving the UE; and means for transmitting, to the RAN node, a user plane suspend response message indicating that downlink transmissions related to a subscription of the UE have been suspended based at least in part on a downlink data suspend response message received from the one or more SMF devices.

In some aspects, an apparatus for wireless communication may include means for receiving, from an AMF device, a request to suspend downlink transmissions for a UE, wherein the request includes one or more QoS flow or DRB identifiers to be suspended; means for transmitting, to a UPF device, an instruction to buffer or discard subsequent downlink data that relates to the one or more QoS flow or DRB identifiers based at least in part on one or more policies; and means for transmitting, to the AMF device, a message to indicate that the downlink transmissions have been suspended based at least in part on the UPF device acknowledging the instruction to buffer or discard the subsequent downlink data that relates to the one or more QoS flow or DRB identifiers.

In some aspects, an apparatus for wireless communication may include means for receiving, from an SMF device, an instruction to suspend downlink transmissions related to one or more QoS flow or DRB identifiers associated with a UE; and means for transmitting, to the SMF device, a message acknowledging the instruction to suspend the downlink transmissions related to the one or more QoS flow or DRB identifiers associated with the UE.

Aspects generally include a method, apparatus, system, computer program product, non-transitory computer-readable medium, user equipment, base station, RAN node, core network node, network controller, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
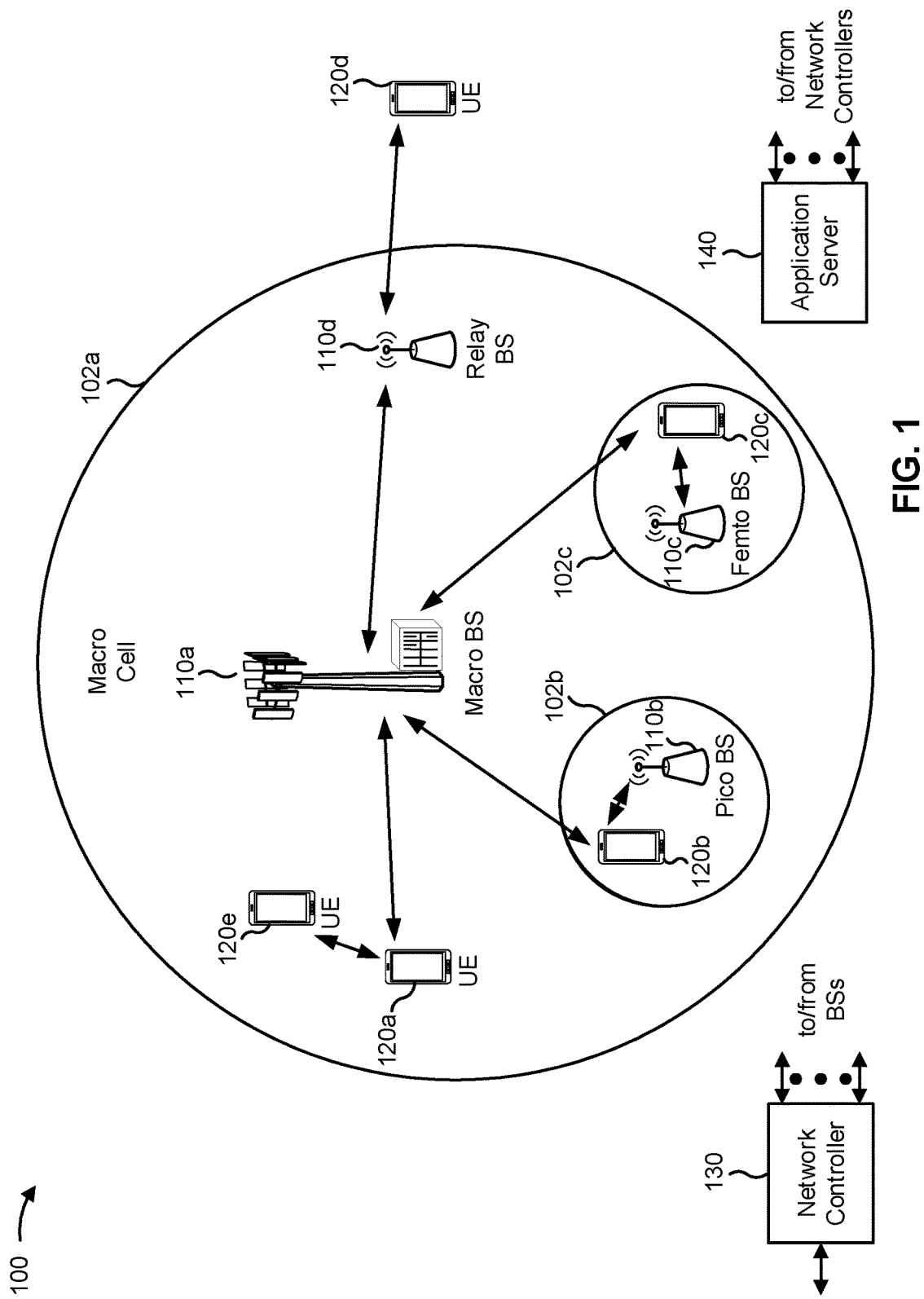
FIG. 1 is a block diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", "radio access network (RAN) node," "cell," and/or the like may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul. In some aspects, wireless network 100 may include one or more network controllers 130. For example, wireless network 100 may include a network controller 130 that implements an access and mobility management function (AMF) device, a network controller 130 that implements a session management function (SMF) device, a network controller 130 that implements a user plane function (UPF) device, and/or the like. In some aspects, the AMF device, the SMF device, the UPF device, and/or the like may be included in a core network of wireless network 100 (e.g., a 5G/NR core network).

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

In some aspects, an application server 140 may host one or more applications, may receive, store, and/or transmit application data associated with the one or more applications, may couple to one or more network controllers 130 and/or one or BSs 110 (e.g., via the one or more network controllers 130) to receive application data from one or more UEs 120, to transmit application data to one or more UEs 120, and/or the like. A UE 120 may access an application hosted by application server 140 via an application client installed on the UE 120, via a web browser installed on the UE 120, and/or the like. In some aspects, application server 140 may include one or more server devices, one or more mobile edge compute (MEC) devices, one or more cloud-computing environments, and/or the like.

As indicated above, FIG. 1 is provided as an example. Other examples may differ from what is described with regard to FIG. 1.

Figure 2:
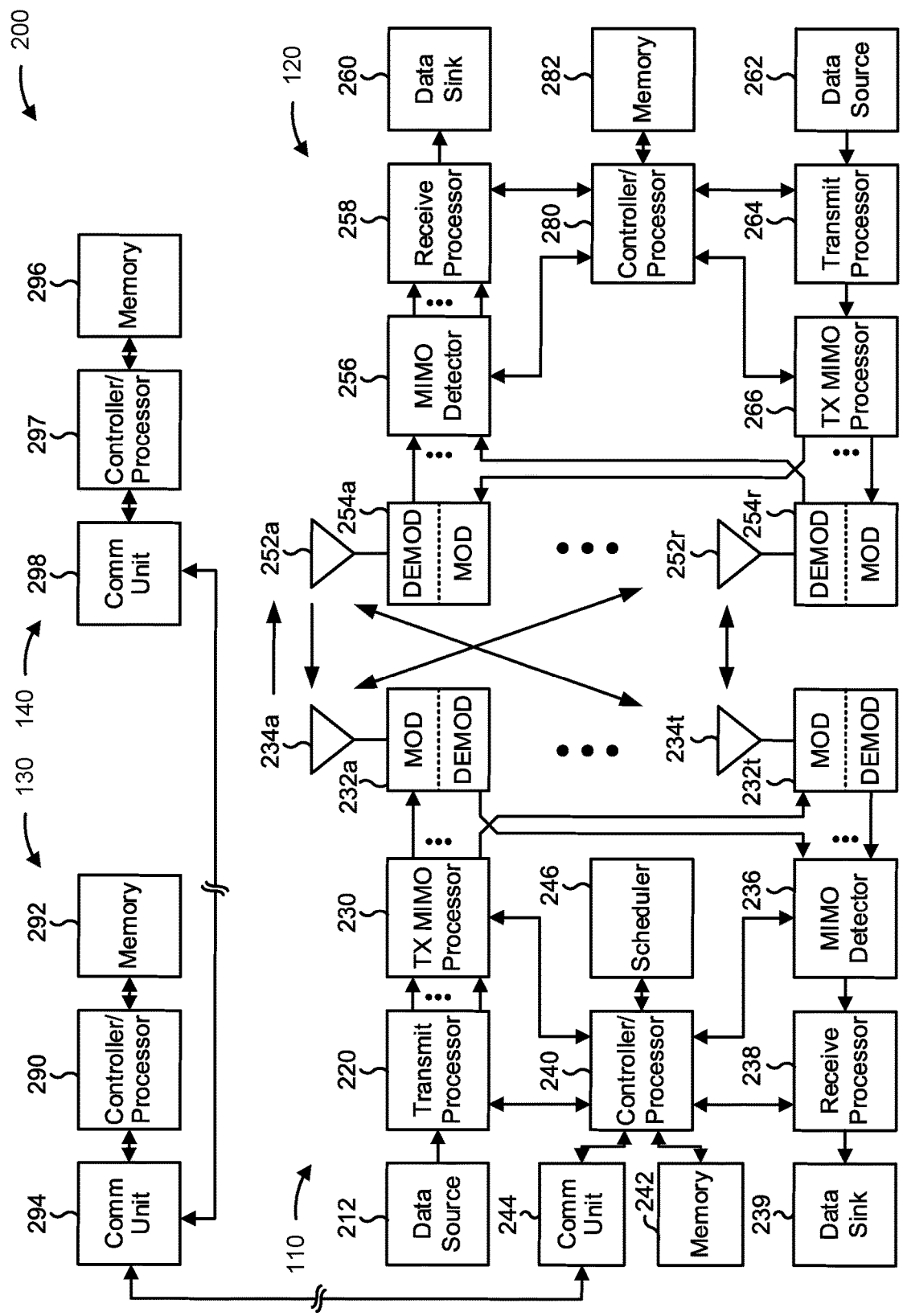
FIG. 2 is a block diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate with network controller 130 via communication unit 244.

Network controller 130 may include communication unit 294, controller/processor 290, and memory 292. Network controller 130 may communicate with base station 110 and/or application server 140 via communication unit 294. Application server 140 may include communication unit 298, controller/processor 297, and memory 296. Application server 140 may communicate with network controller 130 via communication unit 298.

Controller/processor 240 of base station 110, controller/processor 280 of UE 120, controller/processor 290 of network controller 130, and/or any other component(s) of FIG. 2 may perform one or more techniques associated with a radio resource control (RRC) layer based suspend and resume procedure for a user equipment (e.g., UE 120) that has multiple subscriber identity modules (SIMs), as described in more detail elsewhere herein. For example, controller/processor 240 of base station 110, controller/processor 280 of UE 120, controller/processor 290 of network controller 130, and/or any other component(s) of FIG. 2 may perform or direct operations of, for example, process 900 of FIG. 9, process 1000 of FIG. 10, process 1100 of FIG. 11, process 1200 of FIG. 12, process 1300 of FIG. 13, and/or other processes as described herein. Memories 242, 282, and 292 may store data and program codes for base station 110, UE 120, and network controller 130, respectively. In some aspects, memory 242, memory 282, and/or memory 292 may comprise a non-transitory computer-readable medium storing one or more instructions for wireless communication. For example, the one or more instructions, when executed by one or more processors of the base station 110, the UE 120, and/or the network controller 130 may perform or direction operations of, for example, process 900 of FIG. 9, process 1000 of FIG. 10, process 1100 of FIG. 11, process 1200 of FIG. 12, process 1300 of FIG. 13, and/or other processes as described herein. A scheduler 246 may schedule UEs for data transmission on the downlink and/or uplink.

In some aspects, UE 120 may include means for transmitting, to a first radio access network (RAN) node associated with a first subscription, a request to suspend downlink transmissions related to the first subscription based at least in part on a paging request received from a second RAN node associated with a second subscription, means for receiving, from the first RAN node, a release message indicating that one or more core network nodes associated with the first subscription have suspended the downlink transmissions related to the first subscription, means for entering an inactive mode on a first wireless network associated with the first subscription and entering a connected mode on a second wireless network associated with the second subscription based at least in part on the release message, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving, from a UE served by the base station 110, a request to suspend downlink transmissions related to a subscription of the UE, means for transmitting, to a core network node, a user plane suspend message based at least in part on the request to suspend the downlink transmissions, means for transmitting, to the UE, a release message to transition the UE to an inactive mode on a radio access network associated with the apparatus based at least in part on a response message from the core network node indicating that the downlink transmissions related to the subscription of the UE have been suspended, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, network controller 130 may include means for receiving, from a RAN node, a user plane suspend message for a UE served by the RAN node, means for forwarding information contained in the user plane suspend message to one or more session management function (SMF) devices serving the UE, means for transmitting, to the RAN node, a user plane suspend response message indicating that downlink transmissions related to a subscription of the UE have been suspended based at least in part on a downlink data suspend response message received from the one or more SMF devices, and/or the like. In some aspects, such means may include one or more components of network controller 130 described in connection with FIG. 2, such as controller/processor 290, memory 292, communication unit 294, and/or the like.

Additionally, or alternatively, network controller 130 may include means for receiving, from an access and mobility management function (AMF) device, a request to suspend downlink transmissions for a UE, wherein the request includes one or more quality of service (QoS) flow or dedicated radio bearer (DRB) identifiers to be suspended, means for transmitting, to a user plane function (UPF) device, an instruction to buffer or discard subsequent downlink data that relates to the one or more QoS flow or DRB identifiers based at least in part on one or more policies, means for transmitting, to the AMF device, a message to indicate that the downlink transmissions have been suspended based at least in part on the UPF device acknowledging the instruction to buffer or discard the subsequent downlink data that relates to the one or more QoS flow or DRB identifiers, and/or the like. In some aspects, such means may include one or more components of network controller 130 described in connection with FIG. 2, such as controller/processor 290, memory 292, communication unit 294, and/or the like.

Additionally, or alternatively, network controller 130 may include means for receiving, from an SMF device, an instruction to suspend downlink transmissions related to one or more QoS flow or DRB identifiers associated with a UE, means for transmitting, to the SMF device, a message acknowledging the instruction to suspend the downlink transmissions related to the one or more QoS flow or DRB identifiers associated with the UE, and/or the like. In some aspects, such means may include one or more components of network controller 130 described in connection with FIG. 2, such as controller/processor 290, memory 292, communication unit 294, and/or the like.

As indicated above, FIG. 2 is provided as an example. Other examples may differ from what is described with regard to FIG. 2.

Figure 3:
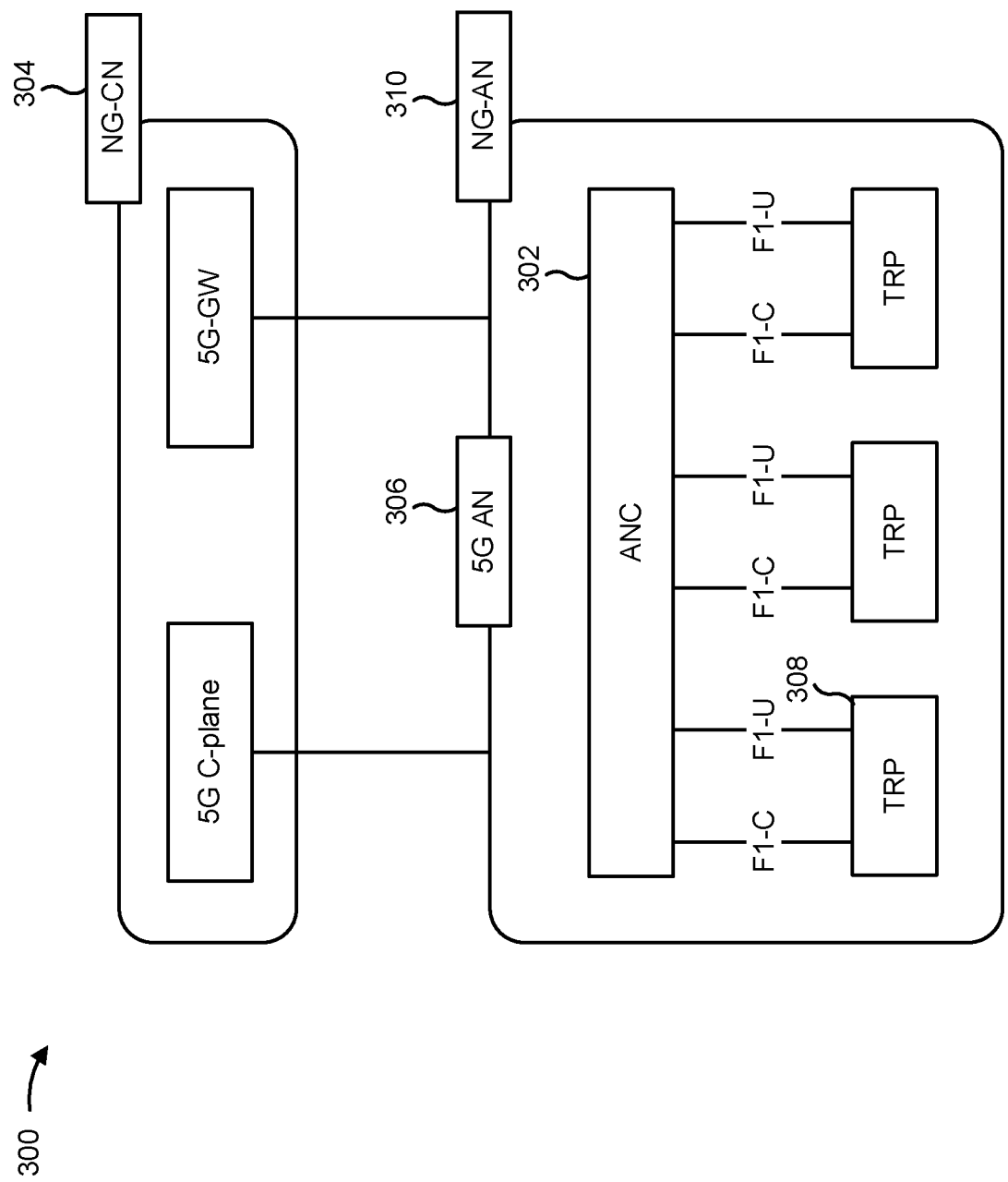
FIG. 3 illustrates an example logical architecture of a distributed radio access network (RAN), in accordance with various aspects of the present disclosure.

FIG. 3 illustrates an example logical architecture of a distributed RAN 300, according to various aspects of the present disclosure. A 5G access node 306 may include an access node controller (ANC) 302. The ANC 302 may be a central unit (CU) of the distributed RAN 300. The distributed RAN 300 may include a backhaul interface to a next generation core network (NG-CN) 304 that terminates at the ANC 302. The backhaul interface to neighboring next generation access nodes (NG-ANs) may terminate at the ANC. The ANC may include one or more transmit receive points (TRPs) 308 (which may also be referred to as BSs, NR BSs, Node Bs, 5G NBs, APs, gNBs, RAN nodes, or some other term). As described above, a TRP may be used interchangeably with "cell."

The TRPs 308 may be a distributed unit (DU). The TRPs may be connected to one ANC (e.g., ANC 302) or more than one ANC (not illustrated). For example, for RAN sharing, radio as a service (RaaS), and service-specific deployments, the TRP 308 may be connected to more than one ANC 302. A TRP 302 may include one or more antenna ports. The TRPs 302 may be configured to individually (e.g., through dynamic selection) or jointly (e.g., through joint transmission) serve traffic to a UE.

The local architecture of RAN 300 may be used to illustrate fronthaul definition. The architecture may be defined to support fronthauling solutions across different deployment types. For example, the architecture may be based at least in part on transmit network capabilities (e.g., bandwidth, latency, and/or jitter).

The architecture may share features and/or components with LTE. According to various aspects, the next generation AN (NG-AN) 310 may support dual connectivity with NR. The NG-AN 310 may share a common fronthaul for LTE and NR.

The architecture may enable cooperation between and among TRPs 308. For example, cooperation may be preset within a TRP 308 and/or across TRPs 308 via the ANC 302. According to various aspects, no inter-TRP interface may be needed/present.

According to various aspects, a dynamic configuration of split logical functions may be present within the architecture of RAN 300. The packet data convergence protocol (PDCP), radio link control (RLC), medium access control (MAC) protocol may be adaptably placed at the ANC or TRP.

According to various aspects, a BS may include a central unit (CU) (e.g., ANC 302) and/or one or more distributed units (e.g., one or more TRPs 308).

As indicated above, FIG. 3 is provided as an example. Other examples may differ from what is described with regard to FIG. 3.

Figure 4:
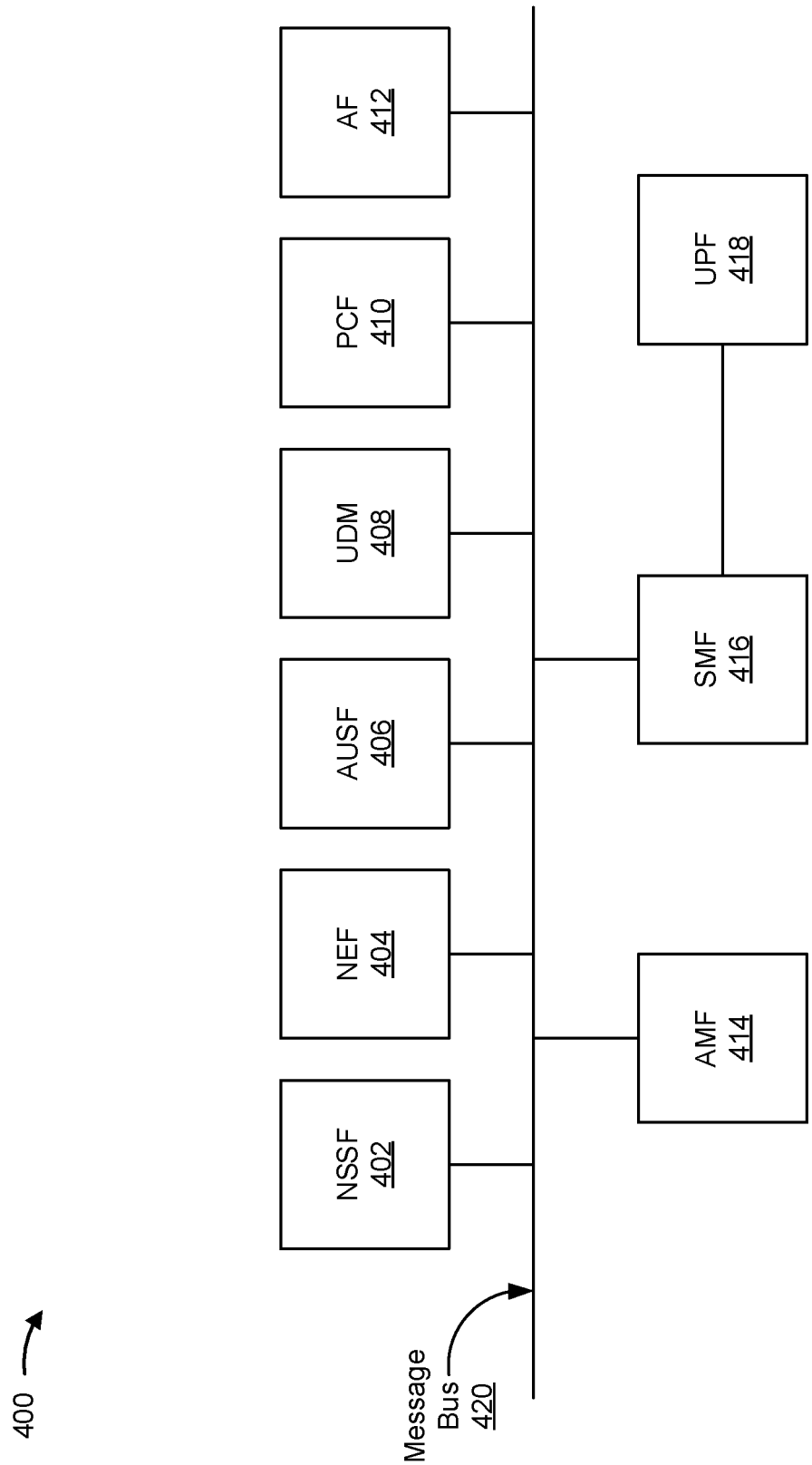
FIG. 4 illustrates an example functional architecture of a core network, in accordance with various aspects of the present disclosure.

FIG. 4 illustrates an example functional architecture of a core network 400, according to various aspects of the present disclosure. For example, FIG. 4 illustrates an example functional architecture of a 5G NG core network that may be included in a 5G wireless telecommunications system. In some aspects, the example functional architecture may be implemented by a core network (e.g., NG-CN 304) and/or one or more devices. While the example functional architecture of core network 400 is shown in FIG. 4 as an example service-based architecture, in some aspects, core network 400 may be implemented in a reference-point architecture.

As shown in FIG. 4, core network 400 may include various functional elements. For example, the functional elements may include a Network Slice Selection Function (NSSF) 402, a Network Exposure Function (NEF) 404, an Authentication Server Function (AUSF) 406, a Unified Data Management (UDM) component 408, a Policy Control Function (PCF) 410, an Application Function (AF) 412, an Access and Mobility Management Function (AMF) 414, a Session Management Function (SMF) 416, and a User Plane Function (UPF) 418. These functional elements may be communicatively connected via a message bus 420, which may be comprised of one or more physical communication channels and/or one or more virtual communication channels. Each of the functional elements shown in FIG. 4 is implemented on one or more devices associated with a wireless telecommunications system. In some aspects, one or more of the functional elements may be implemented on physical devices, such as an access point, a base station, a gateway, a server, and/or the like. In some aspects, one or more of the functional elements may be implemented on one or more computing devices of a cloud computing environment associated with the wireless telecommunications system. In some aspects, the core network 400 may be operatively connected to a RAN (e.g., distributed RAN 300), a data network, and/or the like, via wired and/or wireless connections with UPF 418.

In some aspects, NSSF 402 may select network slice instances for UEs, where NSSF 402 may determine a set of network slice policies to be applied at a RAN level. By providing network slicing, NSSF 402 allows an operator to deploy multiple substantially independent end-to-end networks potentially with the same infrastructure. In some aspects, each slice may be customized for different services. NEF 404 may support the exposure of capabilities and/or events in the wireless telecommunications system to help other entities in the wireless telecommunications system discover network services and/or utilize network resources efficiently.

AUSF 406 may act as an authentication server and support the process of authenticating UEs in the wireless telecommunications system. UDM 408 may store subscriber data and profiles in the wireless telecommunications system. UDM 408 may be used for fixed access, mobile access, and/or the like, in core network 400. PCF 410 may provide a policy framework that incorporates network slicing, roaming, packet processing, mobility management, and/or the like. AF 412 may determine whether UEs provide preferences for a set of network slice policies and support application influence on traffic routing, access to NRF 404, policy control, and/or the like.

In some aspects, AMF 414 may provide registration and mobility management of UEs. SMF 416 may support the establishment, modification, and release of communications sessions in the wireless telecommunications system. For example, SMF 416 may configure traffic steering policies at UPF 418, enforce UE IP address allocation and policies, and/or the like. AME 414 and SMF 416 may act as a termination point for Non Access Stratum (NAS) signaling, mobility management, and/or the like. SMF 416 may act as a termination point for session management related to NAS. A RAN node may send information (e.g., information that identifies or otherwise relates to a UE) to AMY 414 and/or SMF 416 (e.g., via PCF 410).

UPF 418 may serve as an anchor point for intra/inter radio access technology (RAT) mobility. UPF 418 may apply rules to packets, such as rules pertaining to packet routing, traffic reporting, handling user plane QoS, and/or the like. UPF 418 may determine an attribute of application-specific data that is communicated in a communications session. UPF 418 may receive information (e.g., information related to communications with a UE) from one or more RAN nodes (e.g., via SMF 416, an application program interface (API), and/or the like). Furthermore, UPF 418 may have an interface with the one or more RAN nodes that can be used to transfer downlink and uplink user plane traffic to and from the one or more RAN nodes (e.g., UPF 418 may receive downlink user plane traffic destined for a UE from a data network and transfer the downlink user plane traffic to one or more RAN nodes serving the UE, receive uplink user traffic from the one or more RAN nodes serving the UE, and/or the like).

Message bus 420 represents a communication structure for communication among the functional elements. In other words, message bus 420 may permit communication between two or more functional elements. Message bus 420 may be a message bus, HTTP/2 proxy server, and/or the like.

As indicated above, FIG. 4 is provided as an example. Other examples may differ from what is described with regard to FIG. 4.

Figure 5:
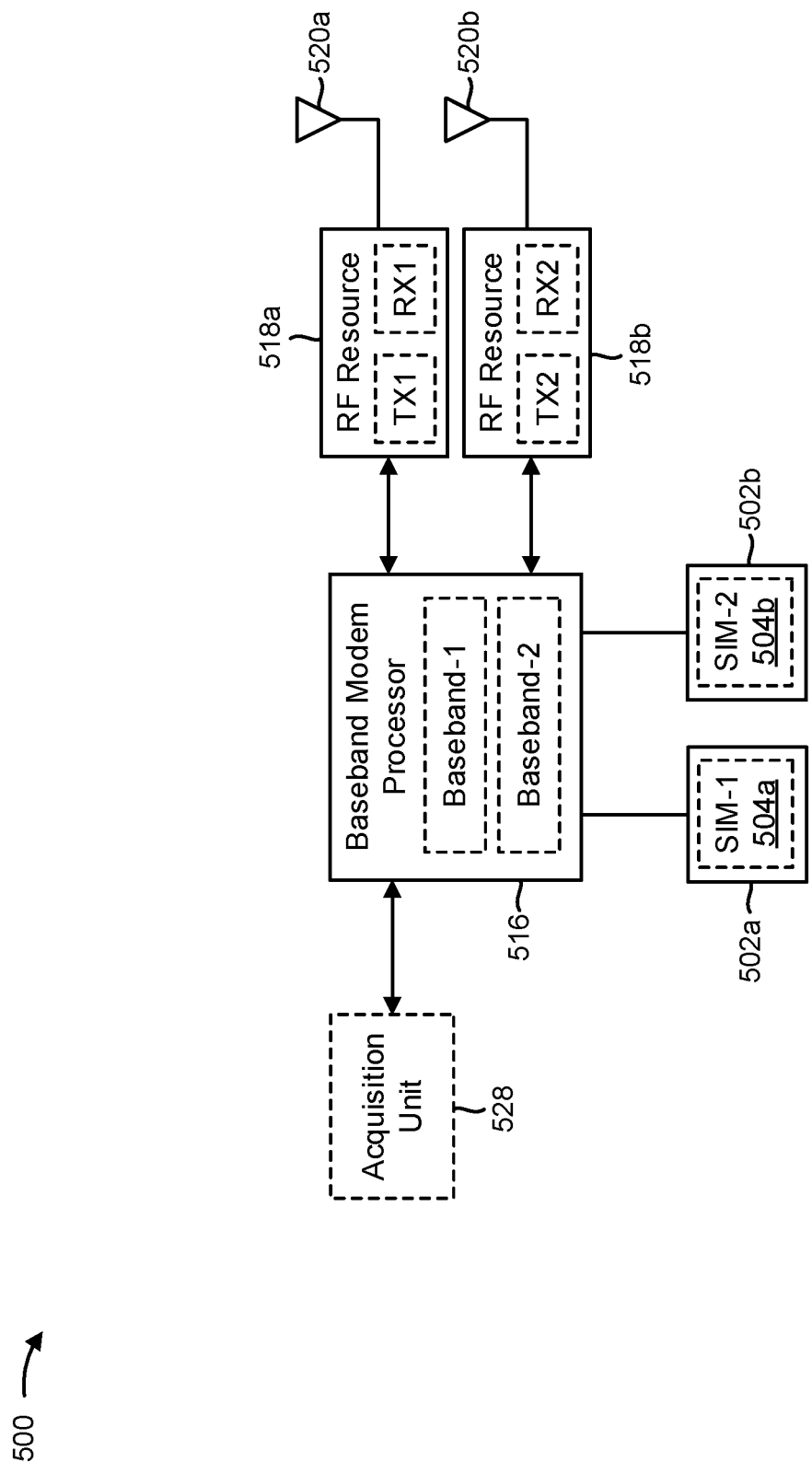
FIG. 5 is a diagram illustrating an example radio and baseband architecture in a UE having multiple subscriber identity modules (SIMs), in accordance with various aspects of the present disclosure.

FIG. 5 is a diagram illustrating an example radio and baseband architecture 500 in a UE having multiple subscriber identity modules (SIMs), in accordance with various aspects of the present disclosure. In some aspects, the radio and baseband architecture 500 shown in FIG. 5 may represent one possible configuration for the UE 120 shown in FIGS. 1-2 and described in further detail above.

In some aspects, as shown in FIG. 5, a first SIM interface 502*a* may receive a first SIM (SIM-1) 504*a* associated with a first subscription, and a second SIM interface 502*b* may receive a second SIM (SIM-2) 504*b* associated with a second subscription. In some aspects, the first subscription and the second subscription may be for different wireless networks or for the same wireless network.

As used herein, the terms "SIM," "SIM card," "subscriber identity module," "universal SIM," "USIM," and variants thereof may be used interchangeably to refer to a memory that may be an integrated circuit or embedded into a removable card, soldered into a device, and/or the like, and that stores an International Mobile Subscriber Identity (IMSI), a related key, and/or other information used to identify and/or authenticate a UE on a wireless network and enable a communication service with the wireless network. Because the information stored in a SIM enables the UE to establish a communication link for a particular communication service with a particular network, the term "SIM" may also be used herein as a shorthand reference to the communication service associated with and enabled by the information stored in a particular SIM, as the SIM and the communication network (as well as the services and subscriptions supported by that network) generally correlate to one another.

In some aspects, SIM-1 504*a* and/or SIM-2 504*b* may be a Universal Integrated Circuit Card (UICC) configured with SIM and/or universal SIM (USIM) applications, enabling access to GSM and/or UMTS networks. The UICC may also provide storage for a phone book and/or other suitable applications. Additionally, or alternatively, a SIM may be an embedded UICC (eUICC) or embedded SIM (eSIM), a universal SIM (USIM), a removable user identity module (R-UIM), and/or the like. SIM-1 504*a* and/or SIM-2 504*b* may have a CPU, ROM, RAM, EEPROM and I/O circuits.

An Integrated Circuit Card Identity (ICCID) SIM serial number may be printed on the SIM card for identification. However, a SIM may be implemented in a portion of memory of the UE, and thus need not be a separate or removable circuit, chip, or card. A SIM used in various aspects may store user account information, an IMSI, a set of SIM application toolkit (SAT) commands, and other network provisioning information, as well as provide storage space for a phone book database that contains user contacts. As part of the network provisioning information, a SIM may store home identifiers (e.g., a System Identification Number (SID)/Network Identification Number (NID) pair, a Home PLMN (HPLMN) code, and/or the like) to indicate the SIM card network operator provider.

In some aspects, each SIM (e.g., SIM-1 504*a* and SIM-2 504*b*) may be associated with a baseband-RF resource chain, which may include a baseband modem processor 516 that may perform baseband/modem functions for communications on at least one SIM. Furthermore, in some aspects, the baseband-RF resource chain may include one or more amplifiers and radios, referred to generally herein as RF resources 518*a*, 518*b* (e.g., first RF resource 518*a* and second RF resource 518*b*). In various embodiments, baseband-RF resource chains may share baseband modem processor 516 (e.g., where baseband modem processor 516 performs baseband/modem functions for all SIMs on the UE). In other embodiments, each baseband-RF resource chain may include physically or logically separate baseband processors (e.g., baseband-1, baseband-2).

In various embodiments, RF resources 518*a*, 518*b* may each be transceivers that perform transmit/receive functions for the associated SIMs 504*a*, 504*b*. RF resources 518*a*, 518*b* may include separate transmit and receive circuitry, or may include a transceiver that combines transmitter and receiver functions. RF resources 518*a*, 518*b* may each be coupled to a wireless antenna (e.g., a first wireless antenna 520*a* or a second wireless antenna 520*b*). RF resources 518*a*, 518*b* may also be coupled to baseband modem processor 516. For simplicity, first RF resource 518*a* (as well as the associated components) may be associated with the first subscription as enabled by SIM-1 504*a*. For example, RF resource 518*a* may be configured to transmit/receive data via a first wireless connection. RF resource 518*b* may be associated with the second subscription as enabled by the SIM-2 504*b*. For example, RF resource 518*b* may be configured to transmit/receive data via a second wireless connection.

In some aspects, the UE implementing radio and baseband architecture 500 may include additional SIM cards, SIM interfaces, RF resources associated with the additional SIM cards, and additional antennae for connecting to additional mobile networks.

In some aspects, radio and baseband architecture 500 may include an acquisition unit 528 configured to manage and/or schedule utilization of RF resources 518*a*, 518*b* for acquisition processes. For example, acquisition unit 528 can be configured to perform acquisition processes for the first subscription and the second subscription. In some aspects, acquisition unit 528 may include (or couple to) at least one of a radio resource control (RRC) layer, a radio resource management (RRM) layer, a radio link control (RLC) layer, a medium access control (MAC) layer, a physical layer, and/or the like.

Hardware and/or software for one or more functions described herein may be incorporated in radio and baseband architecture 500 during manufacturing, for example, as part of the original equipment manufacturer (OEM) configuration of a UE implementing radio and baseband architecture 500. In some aspects, such hardware and/or software may be added to radio and baseband architecture 500 post-manufacture, such as by installing one or more software applications onto the UE implementing radio and baseband architecture 500.

As indicated above, FIG. 5 is provided as an example. Other examples may differ from what is described with respect to FIG. 5.

Figure 6A:
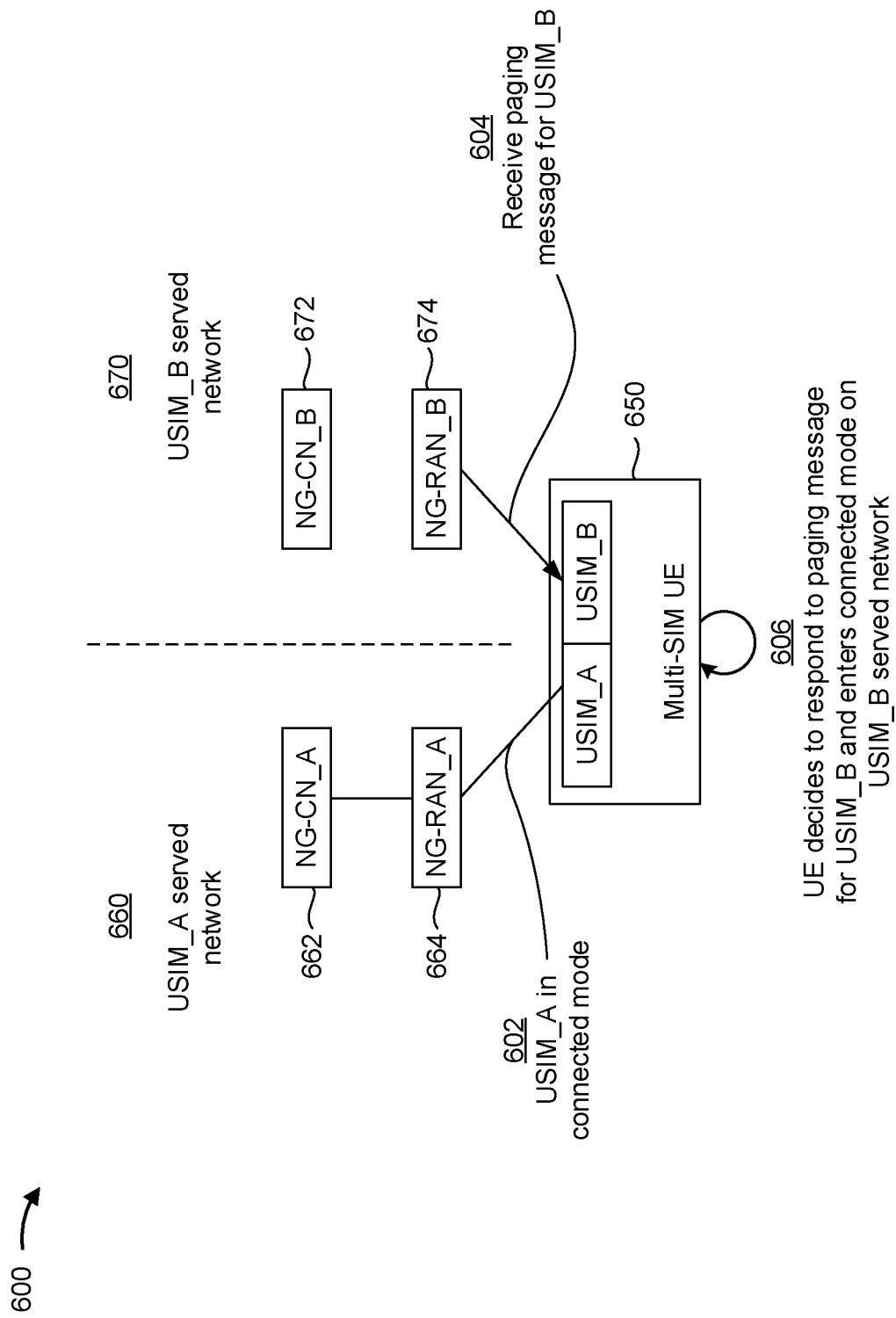
FIGS. 6A-6B are diagrams illustrating an example of a multi-SIM UE transferring service from a first network serving a first SIM to a second network serving a second SIM, in accordance with various aspects of the present disclosure.
Figure 6B:
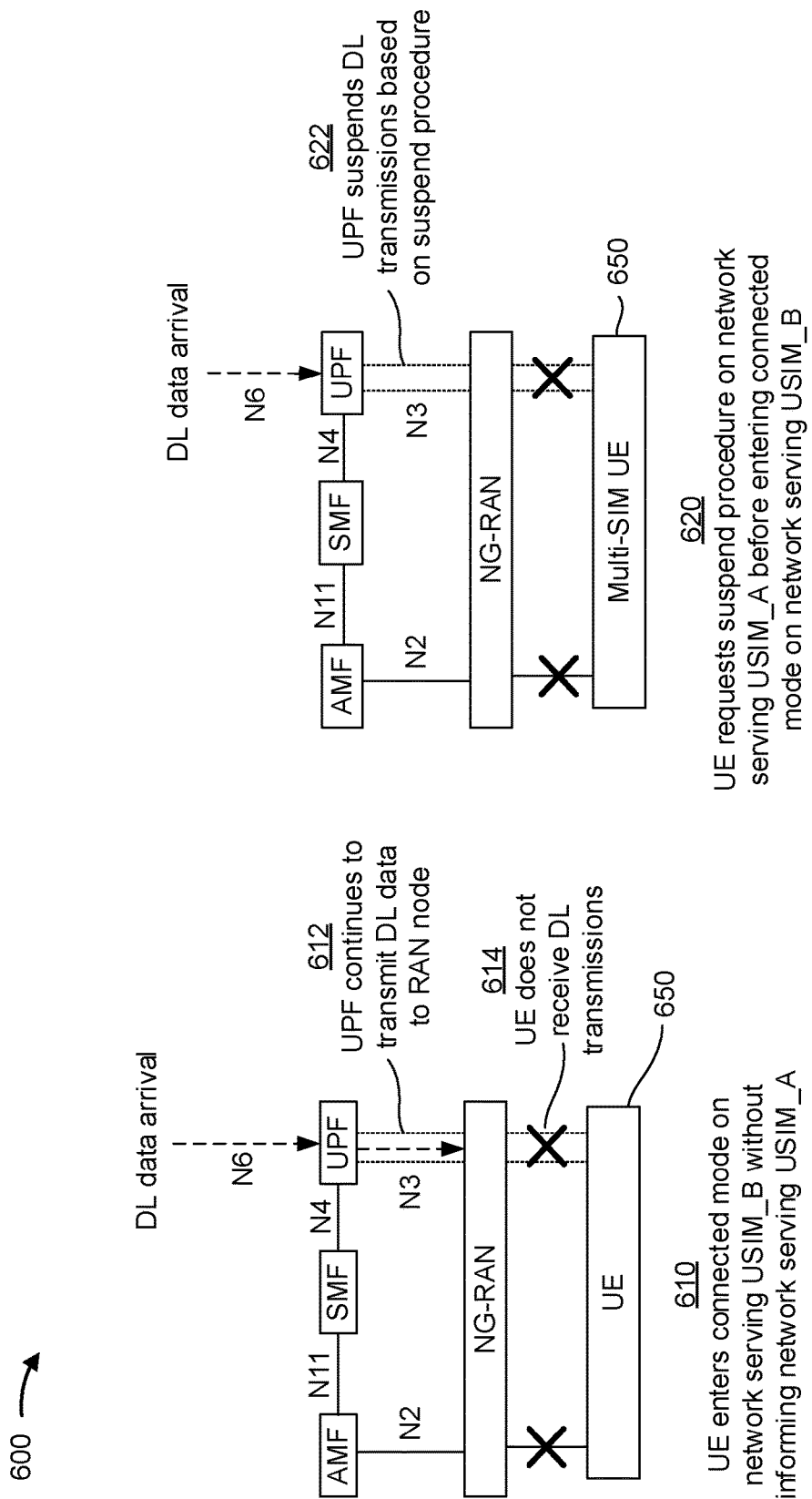

FIGS. 6A-6B are diagrams illustrating an example 600 of a multi-SIM UE 650 transferring service from a first network 660 serving a first SIM to a second network 670 serving a second SIM, in accordance with various aspects of the present disclosure. In general, as shown in FIG. 6A, the multi-SIM UE 650 may include multiple USIMs (USIM_A and USIM_B) that may share common radio and baseband components (e.g., baseband modem processor 516, RF resources 518, wireless antenna 520, and/or the like). Accordingly, the multi-SIM UE 650 shown in FIG. 6A is an example of a multi-SIM-multi-standby (MSMS) communication device. For example, the multi-SIM UE may be a dual-SIM-dual-standby (DSDS) communication device with two SIM cards and corresponding subscriptions that may both be active on standby (e.g., while in an RRC idle or inactive mode), but one is deactivated when the other one is in use (e.g., while the other is in an RRC connected mode). In another example, the multi-SIM UE 650 may be a triple-SIM-triple-standby (TSTS) communication device, which includes three SIM cards and corresponding subscriptions that may all be active on standby, but two are deactivated when the third one is in use. In other examples, the multi-SIM UE 650 may have other suitable multi-SIM configurations, with, for example, four or more SIMs, such that when one is in use, the others are all deactivated. In other words, because the multiple SIMs share common radio and baseband components, only one can operate in an active mode (e.g., RRC connected mode) at a particular point in time.

In some aspects, each USIM may be associated with a subscription to acquire wireless network service from a base station associated with a given cell. For example, as shown in FIG. 6A, USIM_A may be served by a first wireless network 660 (USIM_A served network) that includes a core network 662 (NG-CN A) and a radio access network (RAN) 6640 (NG-RAN A) that includes one or more RAN nodes (e.g., base stations, eNBs, gNBs, TRPs, and/or the like) that may broadcast the first wireless network 660 in a first serving cell. As further shown in FIG. 6A, USIM_B may be served by a second wireless network 670 (USIM_B served network) that includes a core network 672 (NG-CN B) and a RAN 674 (NG-RAN B) that includes one or more RAN nodes that may broadcast the second wireless network 670 in a second serving cell. The multi-SIM UE 650 may acquire wireless service from either the first serving cell or the second serving cell.

For example, as shown in FIG. 6A, and by reference number 602, the multi-SIM UE 650 may be actively communicating with the core network 662 in the first wireless network 660 in a connected mode (e.g., RRC connected mode) through a first wireless connection to a RAN node in the RAN 664 associated with the first wireless network 660, which may correspond to a first subscription associated with USIM_A. Furthermore, in some aspects, the multi-SIM UE 650 may be camped on the second wireless network 670 (e.g., in an RRC idle mode, inactive mode, and/or the like) through a second wireless connection to a RAN node in the RAN 674 associated with the second wireless network 670, which may correspond to a second subscription associated with USIM_B. In some aspects, the RAN nodes associated with the first and second wireless networks 660, 670 may be in communication with one or more nodes in the corresponding core networks 662, 672 over wired and/or wireless connections.

As further shown in FIG. 6A, and by reference number 604, the multi-SIM UE 650 may receive a paging message related to the second subscription associated with USIM_B from a RAN node in the second wireless network 670 serving USIM_B while USIM_A is operating in the connected mode. As further shown in FIG. 6A, and by reference number 606, the multi-SIM UE 650 may decide to respond to the paging message related to the second subscription (e.g., because the paging message relates to a high-priority service such as a voice call, based on one or more policies, and/or the like) and enter a connected mode on the second wireless network 670 serving USIM_B. However, as mentioned above, the multi-SIM UE 650 may be an MSMS (e.g., DSDS, TSTS, and/or the like) communication device with multiple SIMs (e.g., USIM_A and USIM_B) that share common radio and baseband components. Accordingly, if the multi-SIM UE 650 decides to respond to the paging message and enter a connected mode on the second wireless network 670 that serves USIM_B, a radio connection to the first wireless network 660 that serves USIM_A will be released. This may interrupt data transmission related to the first subscription associated with USIM_A because the multi-SIM UE 650 has a single Tx/Rx chain shared among USIM_A and USIM_B.

For example, FIG. 6B illustrates different approaches that the multi-SIM UE 650 may use when transferring service from the first wireless network 660 serving USIM_A to the second wireless network 670 serving USIM_B based on the paging message that the multi-SIM UE 650 receives from the second wireless network 670. In particular, FIG. 6B illustrates example connections and interfaces used for communication among various entities in the first wireless network 660 serving USIM_A. For example, as shown in FIG. 6B, the multi-SIM UE 650 may have a signaling connection and a user plane connection with one or more RAN nodes, which may have various interfaces to enable communication with one or more core network nodes. In some aspects, as shown in FIG. 6B, the one or more RAN nodes may have a signaling connection (e.g., an N2 interface) with an AMF in the core network and may have a user plane connection (e.g., an N3 interface) with a UPF in the core network. Furthermore, the AMF may have a signaling connection (e.g., an N11 interface) with an SMF in the core network and the UPF may have signaling connection (e.g., an N4 interface) with the SMF. In some aspects, the UPF may also receive downlink data intended for the multi-SIM UE 650 from a data network over an N6 interface.

As shown in FIG. 6B, and by reference number 610, one approach that the multi-SIM UE 650 may utilize to transfer service from the first wireless network serving USIM_A to the second wireless network serving USIM_B is to enter a connected mode on the second wireless network without informing the first wireless network serving USIM_A. However, as mentioned above, this will release a radio connection to the first wireless network that serves USIM_A in cases where the multi-SIM UE 650 has common radio and baseband components that are shared among USIM_A and USIM_B. Accordingly, as shown in FIG. 6B, and by reference number 612, the UPF in the core network may continue to transmit downlink data to the RAN node(s) serving the UE 650 via the N3 interface if the multi-SIM UE 650 does not inform the first wireless network prior to entering the connected mode on the second wireless network. As further shown in FIG. 6B, and by reference number 614, the multi-SIM UE 650 does not receive the downlink data transmissions because the radio connection between USIM_A and the RAN node(s) in the first wireless network has been released.

Accordingly, some techniques and apparatuses described herein may utilize a suspend and resume procedure based on signaling at an RRC layer to inform a serving wireless network that a multi-SIM UE 650 will be transitioning service to another wireless network prior to entering a connected mode on the other wireless network. In particular, as shown in FIG. 6B, and by reference number 620, the multi-SIM UE 650 may request a suspend procedure on the wireless network serving USIM_A prior to entering the connected mode on the wireless network serving USIM_B in order to respond to the paging message related to the second subscription associated with USIM_B. For example, as described in further detail elsewhere herein, the multi-SIM UE 650 may transmit a suspend request to the one or more RAN nodes serving the multi-SIM UE 650, and the RAN node(s) may send a corresponding message to the AMF in the serving wireless network via the N2 interface. The AMF may forward information related to the suspend request to the SMF in the serving wireless network via the N11 interface, and the serving SMF may apply one or more policies to determine how to handle a Protocol Data Unit (PDU) session associated with the multi-SIM UE 650.

For example, the SMF may apply the one or more policies to determine whether subsequent downlink data received at the UPF in the serving network is to be discarded or buffered while service related to the first subscription associated with USIM_A is suspended. Additionally, or alternatively, the SMF may apply the one or more policies to determine whether to page the multi-SIM UE 650 if subsequent downlink data intended for the multi-SIM UE 650 arrives at the UPF. In some aspects, the one or more policies may be applied with respect to all downlink data for the PDU session or only for one or more specific quality of service (QoS) flows, dedicated radio bearers (DRBs), and/or the like, which may be indicated in the suspend request provided by the multi-SIM UE 650, configured according to operator policies, and/or the like. In some aspects, the SMF may instruct the UPF in the serving network to block subsequent downlink transmissions associated with the multi-SIM UE 650 accordingly, and reverse signaling may be carried out to acknowledge the suspend request. The multi-SIM UE 650 may then enter an inactive mode on the wireless network serving USIM_A and enter a connected mode on the wireless network serving USIM_B. Meanwhile, the RAN nodes may maintain a signaling connection and a user plane connection to the core network (e.g., via the N2 interface with the AMF and the N3 interface with the UPF) while a radio connection between the RAN nodes and the multi-SIM UE 650 is released.

Accordingly, as shown in FIG. 6B, and by reference number 622, the UPF may suspend downlink transmissions associated with the multi-SIM UE 650 based on the suspend procedure. For example, while the downlink transmissions are suspended, the UPF may discard or buffer subsequent downlink data that arrives at the UPF via the N6 interface. This may save network resources because the UPF avoids sending downlink data to the RAN nodes that will not be received by the multi-SIM UE 650. Furthermore, in cases where the downlink data is buffered, the multi-SIM UE 650 may subsequently initiate a resume procedure to resume the suspended service on the first wireless network (e.g., based on a paging message from the first wireless network, a transition to an idle mode on the second wireless network due to inactivity, and/or the like), which may cause the UPF to start transmitting the buffered downlink data to the RAN node(s) serving the multi-SIM UE 650, resume downlink transmissions to the serving RAN node(s) for subsequent downlink data that arrives at the UPF via the N6 interface, and/or the like.

As indicated above, FIGS. 6A-6B are provided as one or more examples. Other examples may differ from what is described with respect to FIGS. 6A-B.

Figure 7:
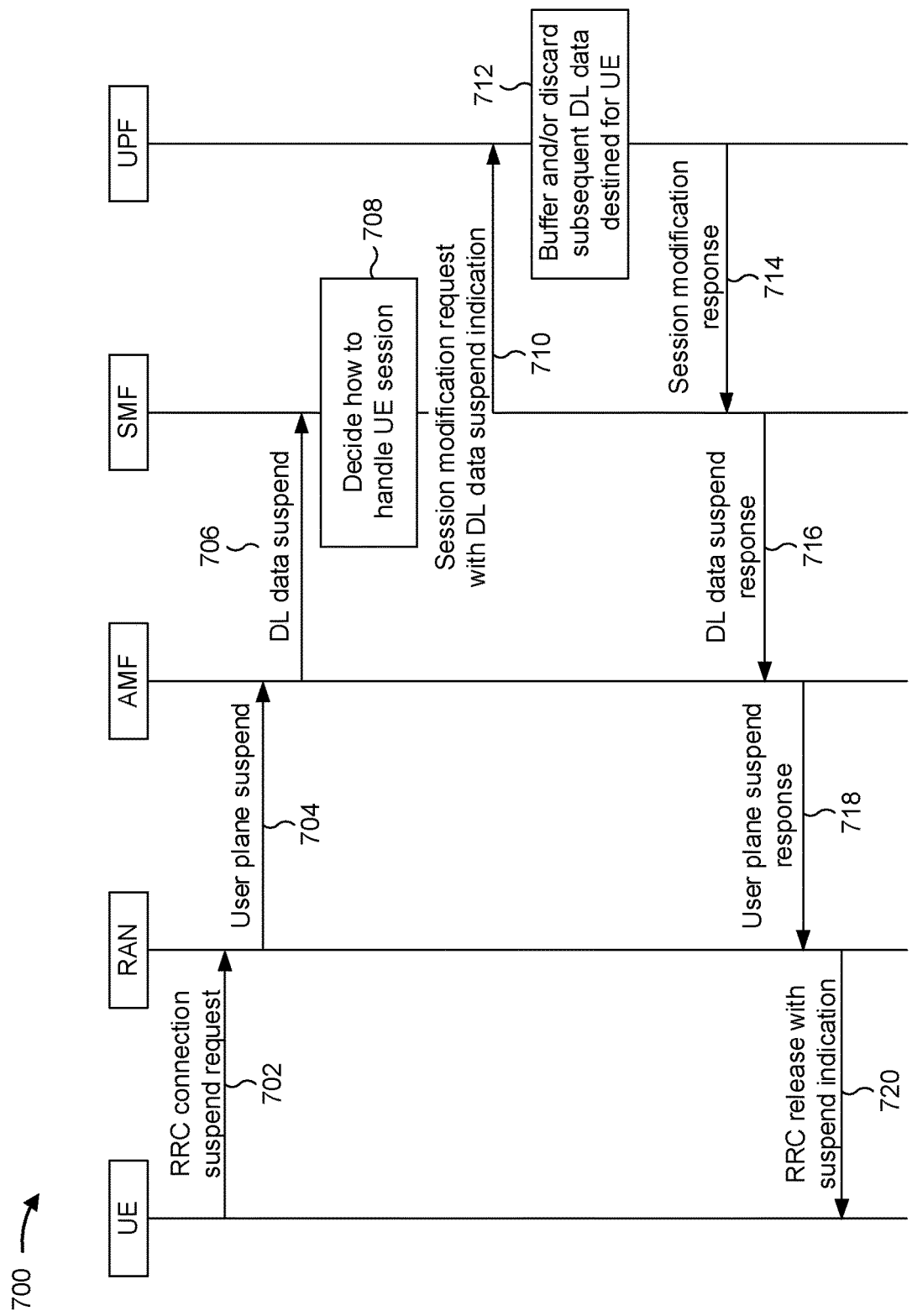
FIG. 7 is a diagram illustrating an example of a suspend procedure that a multi-SIM UE may initiate prior to transferring service from a network serving a first SIM to a network serving a second SIM, in accordance with various aspects of the present disclosure.

FIG. 7 is a diagram illustrating an example 700 of a suspend procedure that a multi-SIM UE may initiate prior to transferring service from a network serving a first SIM to a network serving a second SIM, in accordance with various aspects of the present disclosure. In particular, as described herein, the suspend procedure may generally involve communication and various operations that are distributed among the multi-SIM UE (referred to hereinafter as "UE" for simplicity), one or more RAN nodes in a serving wireless network (referred to hereinafter as "RAN" for simplicity), and core network nodes in the serving wireless network (e.g., an AMY, SMF, and UPF).

As shown in FIG. 7, and by reference number 702, the UE may transmit an RRC connection suspend request to the RAN to suspend service in the serving wireless network (e.g., prior to entering a connected mode to respond to a paging request from a target wireless network associated with a different subscription). In some aspects, the RRC connection suspend request may be a new RRC message that is defined for the specific purpose of suspending service, or the RRC connection suspend may reuse an existing RRC message (e.g., UEAssistanceInformation) to indicate the request to suspend service to the RAN. In some aspects, the RRC connection suspend request may include one or more indicators or identifiers that relate to specific traffic to be suspended (e.g., one or more QoS flow identifiers, DRB identifiers, PDU sessions, and/or the like), or the RRC connection suspend request may include a request to suspend all downlink transmissions. In this way, by indicating the specific traffic to be suspended, the UPF, RAN, and/or the like may be configured to page the UE only if the UPF receives downlink data related to traffic for which suspension was not requested.

As further shown in FIG. 7, and by reference number 704, the RAN may send a user plane suspend message to the AMY via the N2 interface based on the RRC connection suspend request message received from the UE. Furthermore, in some aspects, if the RRC connection suspend request message indicated one or more QoS flow identifiers, DRB identifiers, PDU sessions, and/or the like to be suspended, the user plane suspend message transmitted to the AMF may likewise indicate the QoS flow identifiers, DRB identifiers, PDU sessions, and/or the like to be suspended.

As further shown in FIG. 7, and by reference number 706, the AMF may send a downlink data suspend message to the SMF via the N11 interface based on the user plane suspend message received from the RAN. In general, the downlink data suspend message may contain the same or similar information as the user plane suspend message received from the RAN (e.g., one or more QoS flow identifiers, DRB identifiers, PDU sessions, and/or the like to be suspended). Furthermore, in some aspects, the AMF may send the downlink data suspend message to each SMF serving the UE.

As further shown in FIG. 7, and by reference number 708, the SMF serving the UE may apply one or more policies to decide how to handle a PDU session, a specific QoS flow, a specific DRB, and/or the like associated with the UE based on the downlink data suspend request received from the AMF. For example, in some aspects, the SMF may determine that downlink data associated with one or more PDU sessions is to be blocked (e.g., discarded) or buffered, or the SMF may determine whether to discard or buffer downlink data for individual QoS flows, DRBs, and/or the like. In some aspects, the decision regarding whether to buffer or discard subsequent downlink data destined for the UE may be based on information contained in the downlink data suspend request (e.g., QoS flows, DRBs, and/or the like for which the UE has requested suspension), based on operator policies (e.g., differentiated treatment for different service types), and/or the like.

As further shown in FIG. 7, and by reference number 710, the SMF may transmit, to the UPF via the N4 interface, a session modification request that contains a downlink data suspend indication to instruct the UPF as to how to handle subsequent downlink data that arrives at the UPF via the N6 interface. Furthermore, in some aspects, the SMF may maintain a context for the UE and maintain an N2 signaling connection between the AMF and the RAN (e.g., to enable service to be subsequently resumed, as described in further detail below).

As further shown in FIG. 7, and by reference number 712, the UPF may buffer and/or discard subsequent downlink data destined for the UE based on the downlink data suspend indication contained in the session modification request received from the SMF. In other words, based on the downlink data suspend indication, the UPF may suspend downlink transmissions to the RAN (e.g., via the N3 interface) that are related to the subscription of the UE. For example, where the downlink data suspend indication identifies one or more QoS flows, DRBs, and/or the like for which suspension has been requested, the UPF may block (e.g., buffer or discard) downlink data associated with the identified QoS flows, DRBs, and/or the like. However, if the UPF receives downlink data that is unrelated to the identified QoS flows, DRBs, and/or the like, the UPF may signal the RAN to page the UE to indicate the availability of the downlink data that is unrelated to the suspension request. Furthermore, while downlink transmissions to the UE (via the RAN) are suspended, the UPF may maintain the context for the UE and maintain N3 tunnel information related to the user plane connection between the UPF and the RAN.

As further shown in FIG. 7, and by reference number 714, the UPF may send a session modification response message to the SMF to acknowledge the downlink data suspend indication contained in the session modification request. Furthermore, as shown by reference number 716, the SMF may send a downlink data suspend response message to the AMF based on the session modification response received from the UPF. As further shown in FIG. 7, and by reference number 718, the AMF may send a user plane suspend response message to the RAN based on the downlink data suspend response received from the SMF, and as shown by reference number 720, the RAN may transmit an RRC release message with a suspend indication to the UE based on the user plane suspend response message received from the AMF. Accordingly, after receiving the RRC release message from the RAN, the UE may enter an RRC inactive mode on the serving wireless network and enter an RRC connected mode on the target wireless network associated with the other subscription that received the paging message.

As indicated above, FIG. 7 is provided as an example. Other examples may differ from what is described with respect to FIG. 7.

Figure 8:
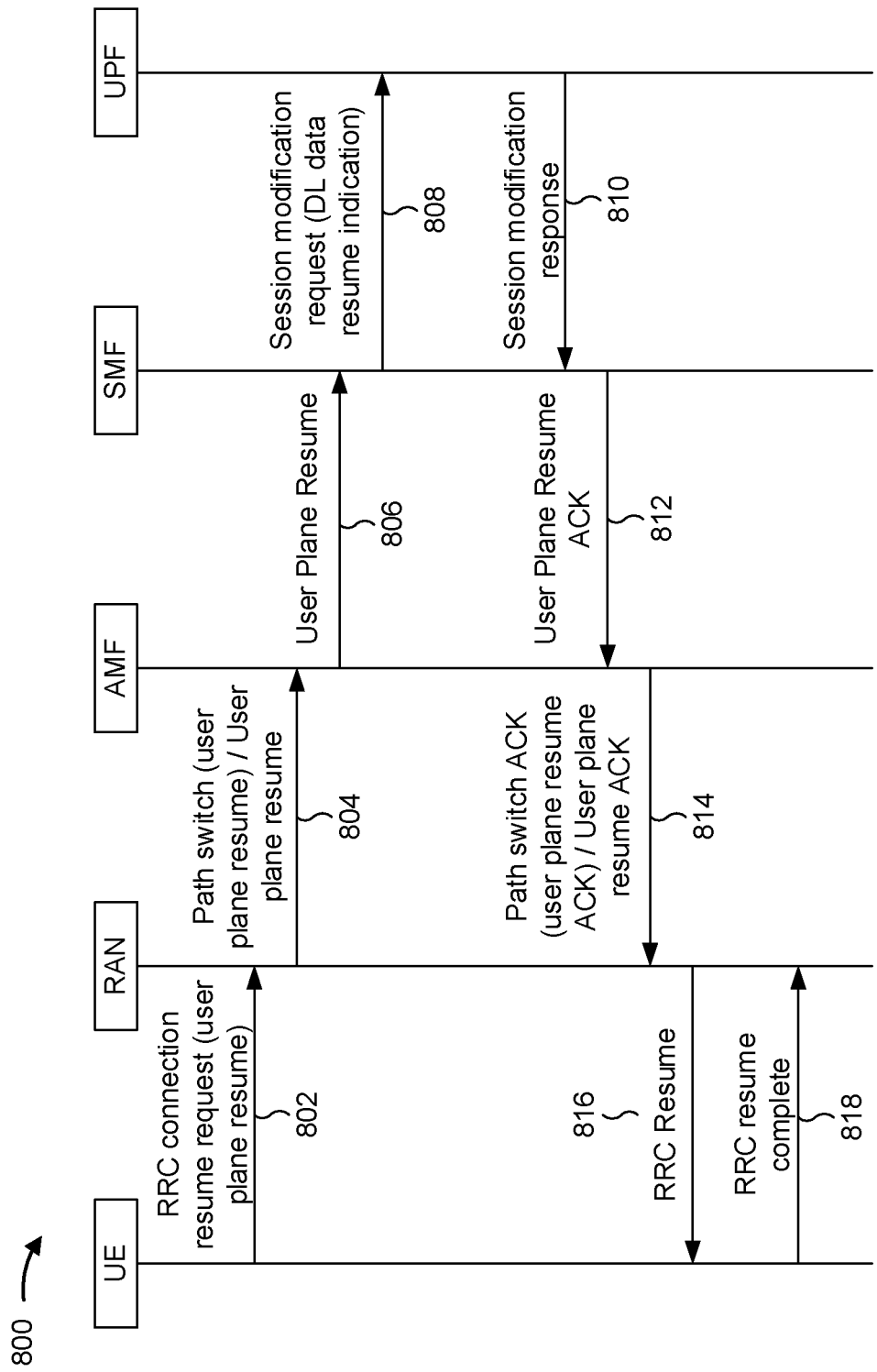
FIG. 8 is a diagram illustrating an example of a resume procedure that a multi-SIM UE may initiate to resume suspended network service, in accordance with various aspects of the present disclosure.

FIG. 8 is a diagram illustrating an example 800 of a resume procedure that the UE may initiate to resume suspended network service, in accordance with various aspects of the present disclosure. In particular, as described herein, the resume procedure may generally involve communication and various operations distributed among a multi-SIM UE that has previously requested suspension of service in a wireless network, one or more RAN nodes in the wireless network in which service was suspended, and various core network nodes (e.g., an AMF, SMF, and UPF) in the wireless network in which service was suspended.

As shown in FIG. 8, and by reference number 802, the UE may transmit, to the RAN, an RRC connection resume request with a user plane resume indication in order to resume suspended service in the wireless network. For example, in some aspects, the UE may transmit the RRC connection resume request based on inactivity in the other wireless network associated with the other subscription of the UE (e.g., based on the other subscription entering an RRC idle or RRC inactive mode). Additionally, or alternatively, the UE may transmit the connection resume request to resume the suspended service based on a paging message indicating availability of downlink data that is unrelated to one or more QoS flows, DRBs, PDU sessions, and/or the like for which the UE requested suspension.

As further shown in FIG. 8, and by reference number 804, the RAN may send a request to resume downlink user plane transmissions to the AMF via the N2 interface. For example, in some aspects, a RAN node that receives the RRC connection resume request from the UE may be the same RAN node that was serving the UE when service was suspended or a different RAN node. In the latter (different RAN) case, the RAN may retrieve a context associated with the UE from a last serving gNB, TRP, and/or the like, and the request sent to the AMF may be a path switch request that includes a user plane resume indication. In the former case, where the RAN node that receives the RRC connection resume request from the UE is the same RAN node that was serving the UE when service was suspended, the RAN may retrieve the context associated with the UE locally, and the request sent to the AMF may be an N2 user plane resume message.

As further shown in FIG. 8, and by reference number 806, the AMF may send a user plane resume message to the SMF via the N11 interface based on the request received from the RAN. In some aspects, the AMF may send the user plane resume message to each SMF that was previously serving the subscription associated with the UE.

As further shown in FIG. 8, and by reference number 808, the SMF serving the UE may transmit, to the UPF via the N4 interface, a session modification request that contains a downlink data resume indication to instruct the UPF to resume downlink transmissions via the N3 tunnel. Furthermore, in some aspects, the SMF may activate the previous context based on the user plane resume message received from the AMF, and the UPF may likewise activate the previous context associated with the UE based on the downlink data resume indication received from the SMF.

As further shown in FIG. 8, and by reference number 810, the UPF may send a session modification response message to the SMF to acknowledge the downlink data resume indication contained in the session modification request.

Furthermore, as shown by reference number 812, the SMF may send a user plane resume acknowledgement message to the AMF based on the session modification response received from the UPF. As further shown in FIG. 8, and by reference number 814, the AMF may send an acknowledgement message to the RAN indicating that downlink transmissions via a user plane connection between the RAN and the UPF are to be resumed. For example, if the resume message received from the RAN (e.g., as indicated by reference number 804) was a path switch message with a user plane resume indication, then the acknowledgement sent from the AMF to the RAN may be a path switch acknowledgement message that contains a user plane resume indication. Alternatively, if the initial resume message received from the RAN was an N2 user plane resume message, then the acknowledgement sent from the AMF to the RAN may be an N2 user plane resume acknowledgement message.

As further shown by reference number 816, the RAN may transmit an RRC resume message to the UE based on the acknowledgement message received from the AMF, and as shown by reference number 818, the UE may transmit an RRC resume complete message to the RAN based on the RRC resume message. Accordingly, the UE may re-enter a connected mode on a wireless network that includes the RAN, AMF, SMF, and UPF and receive downlink user plane traffic that the UPF sends to the RAN via the N3 tunnel. For example, if the UPF was buffering any downlink data intended for the UE while the downlink transmissions via the N3 tunnel were suspended, the UPF may start to transmit the buffered downlink data to the RAN via the N3 tunnel after the UE transmits the RRC resume complete message and re-enters connected mode, and the RAN may forward the downlink data sent via the N3 tunnel to the UE. Furthermore, the UPF may transmit any subsequent downlink data that arrives at the UPF from a data network to the RAN via the N3 tunnel, and the RAN may forward the downlink data sent via the N3 tunnel to the UE.

As indicated above, FIG. 8 is provided as an example. Other examples may differ from what is described with respect to FIG. 8.

Figure 9:
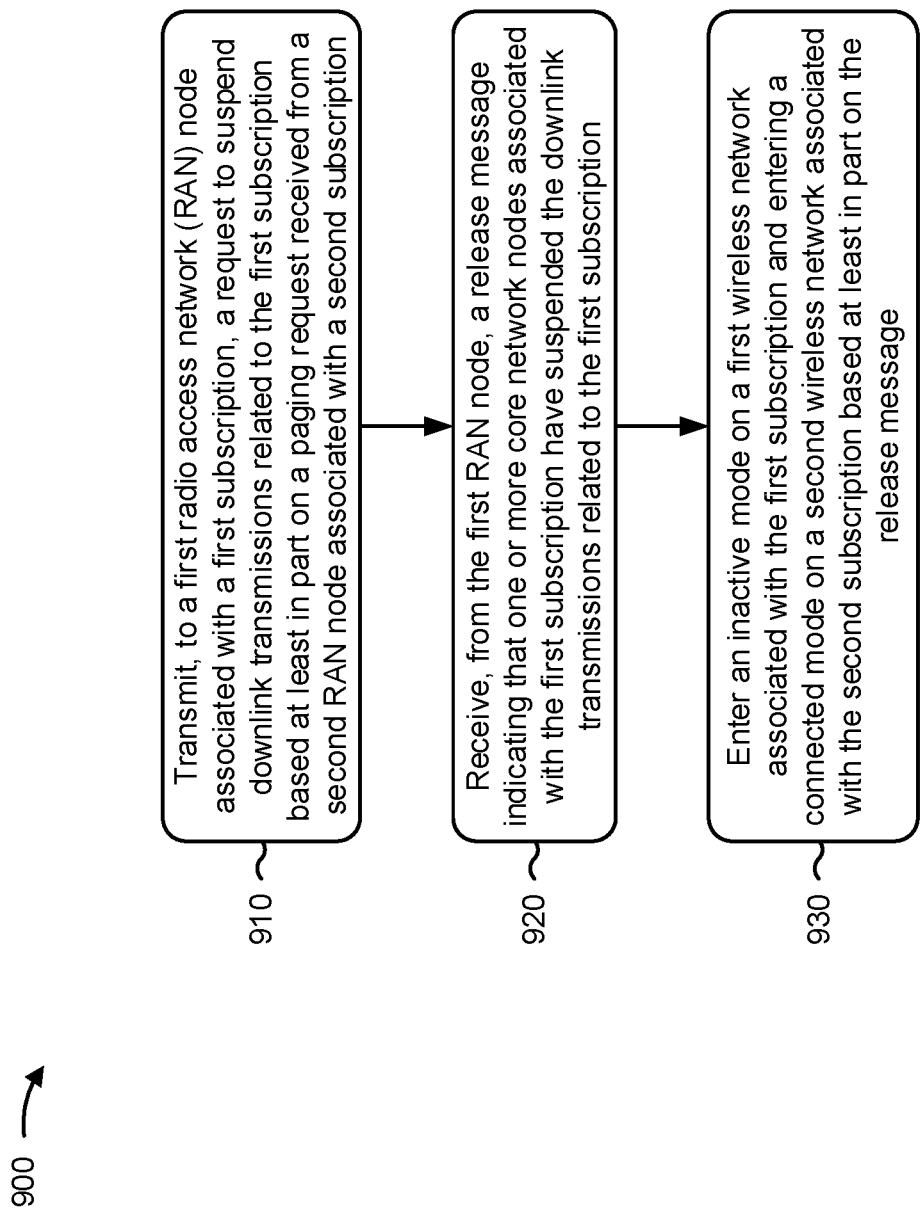
FIG. 9 is a diagram illustrating an example process performed, for example, by a user equipment, in accordance with various aspects of the present disclosure.

FIG. 9 is a diagram illustrating an example process 900 performed, for example, by a UE, in accordance with various aspects of the present disclosure. Example process 900 is an example where a UE (e.g., UE 120, multi-SIM UE 560, a UE implementing radio and baseband architecture 500, and/or the like) performs operations associated with an RRC layer based suspend and resume procedure.

As shown in FIG. 9, in some aspects, process 900 may include transmitting, to a first RAN node associated with a first subscription, a request to suspend downlink transmissions related to the first subscription based at least in part on a paging request received from a second RAN node associated with a second subscription (block 910). For example, the UE (e.g., using transmit processor 264, controller/processor 280, memory 282, radio and baseband architecture 500, and/or the like) may transmit, to a first RAN node associated with a first subscription, a request to suspend downlink transmissions related to the first subscription based at least in part on a paging request received from a second RAN node associated with a second subscription, as described above.

As further shown in FIG. 9, in some aspects, process 900 may include receiving, from the first RAN node, a release message indicating that one or more core network nodes associated with the first subscription have suspended the downlink transmissions related to the first subscription (block 920). For example, the UE (e.g., using receive processor 258, controller/processor 280, memory 282, radio and baseband architecture 500 and/or the like) may receive, from the first RAN node, a release message indicating that one or more core network nodes associated with the first subscription have suspended the downlink transmissions related to the first subscription, as described above.

As further shown in FIG. 9, in some aspects, process 900 may include entering an inactive mode on a first wireless network associated with the first subscription and entering a connected mode on a second wireless network associated with the second subscription based at least in part on the release message (block 930). For example, the UE (e.g., using receive processor 258, transmit processor 264, controller/processor 280, memory 282, radio and baseband architecture 500 and/or the like) may enter an inactive mode on a first wireless network associated with the first subscription and enter a connected mode on a second wireless network associated with the second subscription based at least in part on the release message, as described above.

Process 900 may include additional aspects, such as any single aspect or any combination of aspects described below and/or in connection with one or more other processes described elsewhere herein.

In a first aspect, the request transmitted to the RAN node includes one or more of an RRC connection suspend message or an RRC UE assistance information message.

In a second aspect, alone or in combination with the first aspect, the request transmitted to the RAN node includes one or more QoS flow or DRB identifiers associated with the downlink transmissions to be suspended.

In a third aspect, alone or in combination with one or more of the first and second aspects, the UE may initiate a procedure to resume the downlink transmissions related to the first subscription based at least in part on the UE transitioning from the connected mode to an idle mode or an inactive mode on the second wireless network.

In a fourth aspect, alone or in combination with one or more of the first through third aspects, when initiating the procedure to resume the downlink transmissions, the UE may transmit, to the first RAN node, a connection resume request that includes a user plane resume indication.

In a fifth aspect, alone or in combination with one or more of the first through fourth aspects, the UE may receive, from the first RAN node, an RRC resume message indicating that the one or more core network nodes associated with the first subscription have ceased to suspend the downlink transmissions; transmit, to the first RAN node, an RRC resume complete message to acknowledge the RRC resume message; and receive, from the first RAN node, the downlink transmissions related to the first subscription.

In a sixth aspect, alone or in combination with one or more of the first through fifth aspects, the UE includes a first SIM associated with the first subscription and a second SIM associated with the second subscription.

In a seventh aspect, alone or in combination with one or more of the first through sixth aspects, the UE includes a set of radio and baseband components that are shared among the first SIM and the second SIM.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
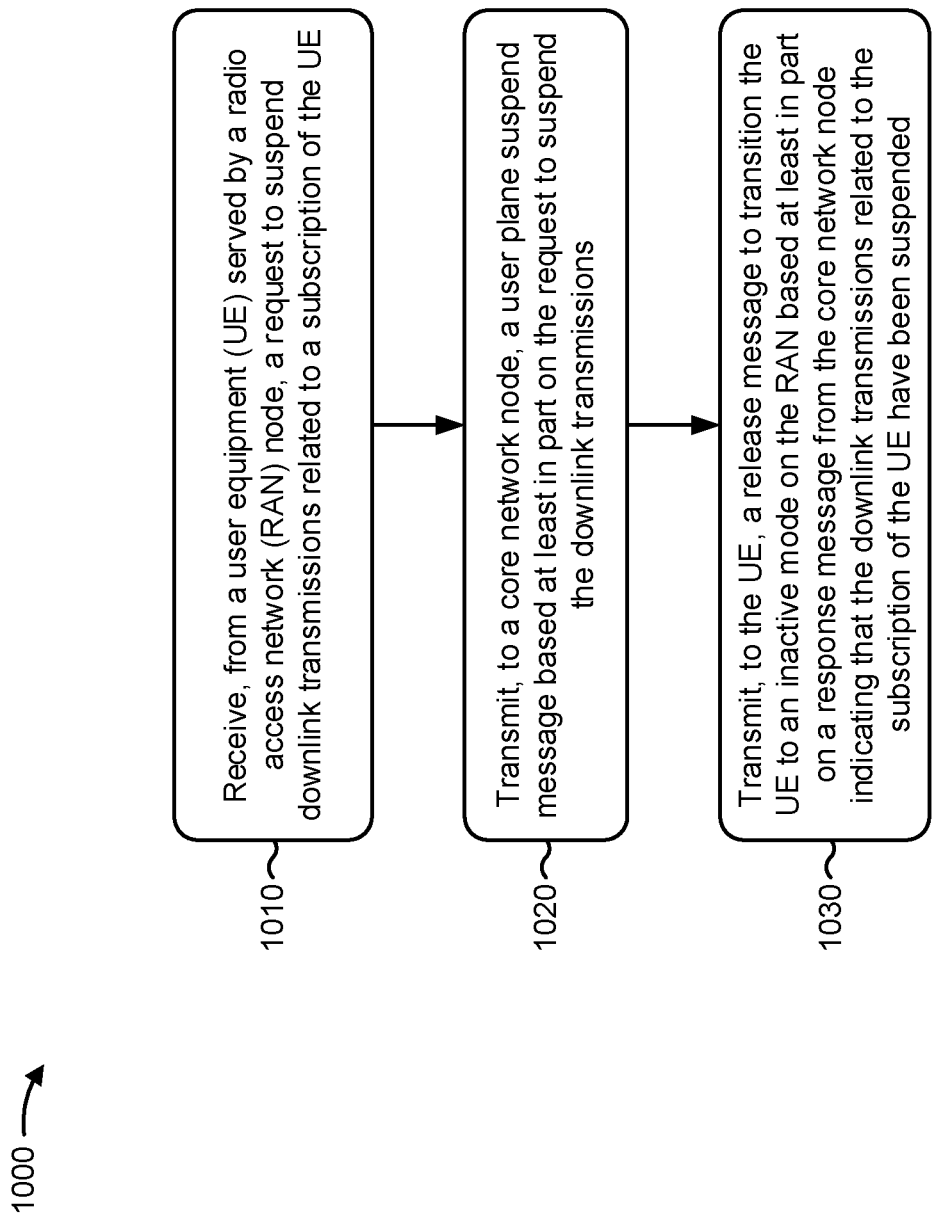
FIG. 10 is a diagram illustrating an example process performed, for example, by a RAN node, in accordance with various aspects of the present disclosure.

FIG. 10 is a diagram illustrating an example process 1000 performed, for example, by a RAN node, in accordance with various aspects of the present disclosure. Example process 1000 is an example where a RAN node (e.g., base station 110, TRP 308, and/or the like) performs operations associated with an RRC layer based suspend and resume procedure.

As shown in FIG. 10, in some aspects, process 1000 may include receiving, from a UE served by the RAN node, a request to suspend downlink transmissions related to a subscription of the UE (block 1010). For example, the RAN node (e.g., using receive processor 238, transmit processor 220, controller/processor 240, memory 242, and/or the like) may receive, from a UE served by the RAN node, a request to suspend downlink transmissions related to a subscription of the UE, as described above.

As further shown in FIG. 10, in some aspects, process 1000 may include transmitting, to a core network node, a user plane suspend message based at least in part on the request to suspend the downlink transmissions (block 1020). For example, the RAN node (e.g., using transmit processor 220, controller/processor 240, memory 242, and/or the like) may transmit, to a core network node, a user plane suspend message based at least in part on the request to suspend the downlink transmissions, as described above.

As further shown in FIG. 10, in some aspects, process 1000 may include transmitting, to the UE, a release message to transition the UE to an inactive mode on the RAN based at least in part on a response message from the core network node indicating that the downlink transmissions related to the subscription of the UE have been suspended (block 1030). For example, the RAN node (e.g., using transmit processor 220, controller/processor 240, memory 242, and/or the like) may transmit, to the UE, a release message to transition the UE to an inactive mode on the RAN based at least in part on a response message from the core network node indicating that the downlink transmissions related to the subscription of the UE have been suspended, as described above.

Process 1000 may include additional aspects, such as any single aspect or any combination of aspects described below and/or in connection with one or more other processes described elsewhere herein.

In a first aspect, the request to suspend the downlink transmissions includes one or more of an RRC connection suspend message or an RRC UE assistance information message.

In a second aspect, alone or in combination with the first aspect, the user plane suspend message includes one or more QoS flow or DRB identifiers indicated by the UE in the request to suspend the downlink transmissions.

In a third aspect, alone or in combination with one or more of the first and second aspects, the RAN node may transmit, to the UE, a paging message that is related to traffic activity associated with the subscription of the UE, and that is unrelated to the one or more QoS flow or DRB identifiers.

In a fourth aspect, alone or in combination with one or more of the first through third aspects, the RAN node may receive, from the UE, a connection resume request that includes a user plane resume indication; transmit, to the core network node, a request to resume the downlink transmissions related to the subscription of the UE based at least in part on the connection resume request; and transmit, to the UE, an RRC resume message indicating that the downlink transmissions related to the subscription of the UE have been resumed based at least in part on a message from the core network node acknowledging the request to resume the downlink transmissions.

In a fifth aspect, alone or in combination with one or more of the first through fourth aspects, the RAN node may receive, from the UE, an RRC resume complete message to acknowledge the RRC resume message and forward, to the UE, the downlink transmissions related to the subscription of the UE, which may be received from a user plane function device.

In a sixth aspect, alone or in combination with one or more of the first through fifth aspects, the request to resume the downlink transmissions includes one or more of a user plane resume message based on a local context associated with the UE or a path switch request message based on a context retrieved from a most recent base station that served the UE.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
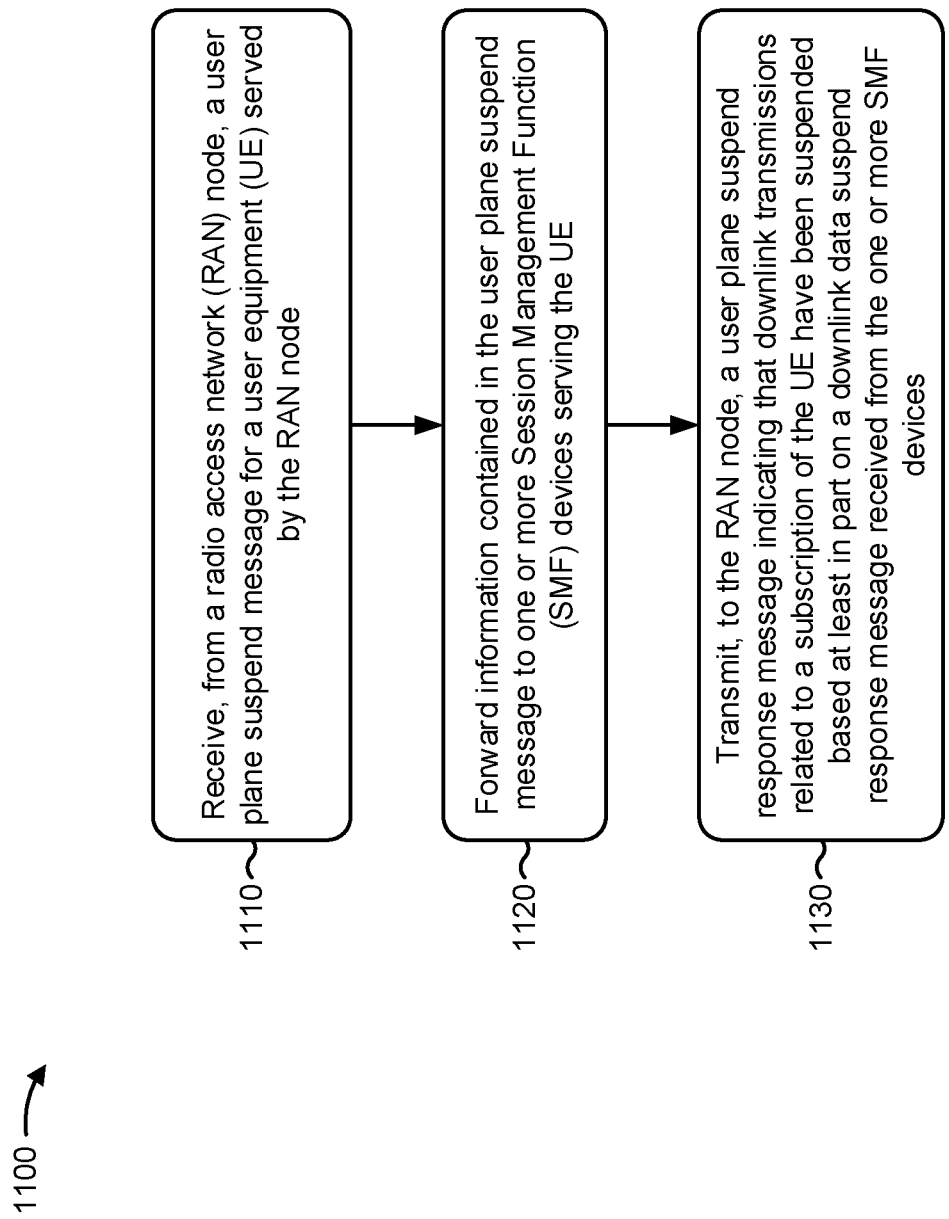
FIGS. 11-13 are diagrams illustrating example processes performed, for example, by one or more core network nodes, in accordance with various aspects of the present disclosure.

FIG. 11 is a diagram illustrating an example process 1100 performed, for example, by a core network node, in accordance with various aspects of the present disclosure. Example process 1100 is an example where a core network node (e.g., AMF 414 and/or the like) performs operations associated with an RRC layer based suspend and resume procedure.

As shown in FIG. 11, in some aspects, process 1100 may include receiving, from a RAN node, a user plane suspend message for a UE served by the RAN node (block 1110). For example, the AMF (e.g., using controller/processor 290, memory 292, communication unit 294, and/or the like) may receive, from a RAN node, a user plane suspend message for a UE served by the RAN node, as described above.

As further shown in FIG. 11, in some aspects, process 1100 may include forwarding information contained in the user plane suspend message to one or more SMF devices serving the UE (block 1120). For example, the AMF (e.g., using controller/processor 290, memory 292, communication unit 294, and/or the like) may forward information contained in the user plane suspend message to one or more SMF devices serving the UE, as described above.

As further shown in FIG. 11, in some aspects, process 1100 may include transmitting, to the RAN node, a user plane suspend response message indicating that downlink transmissions related to a subscription of the UE have been suspended based at least in part on a downlink data suspend response message received from the one or more SMF devices (block 1130). For example, the AMF (e.g., using controller/processor 290, memory 292, communication unit 294, and/or the like) may transmit, to the RAN node, a user plane suspend response message indicating that downlink transmissions related to a subscription of the UE have been suspended based at least in part on a downlink data suspend response message received from the one or more SMF devices, as described above.

Process 1100 may include additional aspects, such as any single aspect or any combination of aspects described below and/or in connection with one or more other processes described elsewhere herein.

In a first aspect, the information forwarded to the one or more SMF devices includes one or more QoS flow or DRB identifiers to be suspended.

In a second aspect, alone or in combination with the first aspect, the AMF may suspend paging related to the one or more QoS flow or DRB identifiers.

In a third aspect, alone or in combination with one or more of the first and second aspects, the AMF may receive, from the RAN node, a request to resume the downlink transmissions related to the subscription of the UE; forward information contained in the request to resume the downlink transmissions to the one or more SMF devices; and transmit, to the RAN node, an acknowledgement message indicating that the downlink transmissions related to the subscription of the UE have been resumed based at least in part on a message from the one or more SMF devices.

In a fourth aspect, alone or in combination with one or more of the first through third aspects, the acknowledgement message includes one or more of a user plane resume acknowledgement message or a path switch acknowledgement message with a user plane resume acknowledgement indicator.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
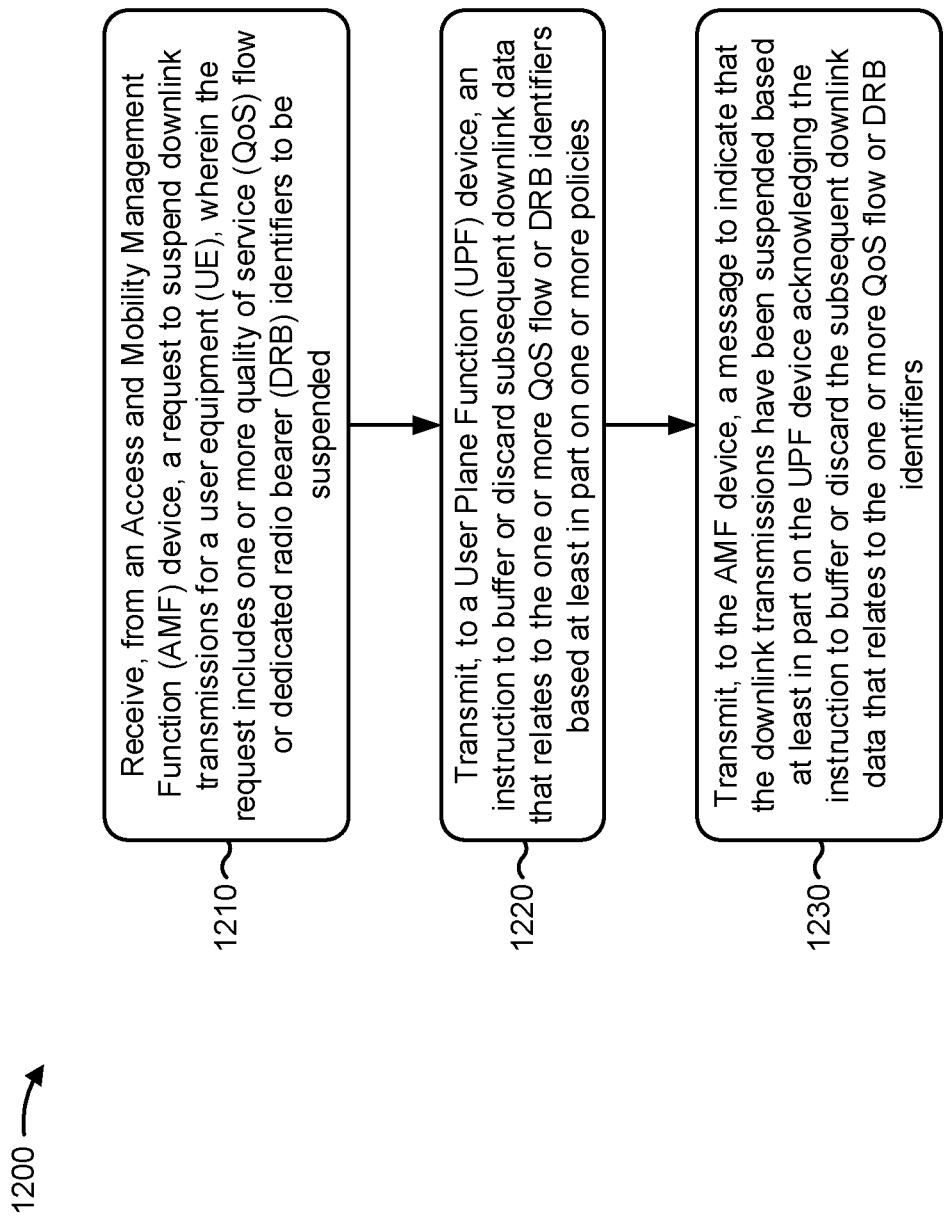

FIG. 12 is a diagram illustrating an example process 1200 performed, for example, by a core network node, in accordance with various aspects of the present disclosure. Example process 1200 is an example where a core network node (e.g., SMF 416 and/or the like) performs operations associated with an RRC layer based suspend and resume procedure.

As shown in FIG. 12, in some aspects, process 1200 may include receiving, from an AMF device, a request to suspend downlink transmissions for a UE, wherein the request includes one or more QoS flow or DRB identifiers to be suspended (block 1210). For example, the SMF (e.g., using controller/processor 290, memory 292, communication unit 294, and/or the like) may receive, from an AMF device, a request to suspend downlink transmissions for a UE, as described above. In some aspects, the request includes one or more QoS flow or DRB identifiers to be suspended.

As further shown in FIG. 12, in some aspects, process 1200 may include transmitting, to a UPF device, an instruction to buffer or discard subsequent downlink data that relates to the one or more QoS flow or DRB identifiers based at least in part on one or more policies (block 1220). For example, the SMF (e.g., using controller/processor 290, memory 292, communication unit 294, and/or the like) may transmit, to a UPF device, an instruction to buffer or discard subsequent downlink data that relates to the one or more QoS flow or DRB identifiers based at least in part on one or more policies, as described above.

As further shown in FIG. 12, in some aspects, process 1200 may include transmitting, to the AMF device, a message to indicate that the downlink transmissions have been suspended based at least in part on the UPF device acknowledging the instruction to buffer or discard the subsequent downlink data that relates to the one or more QoS flow or DRB identifiers (block 1230). For example, the SMF (e.g., using controller/processor 290, memory 292, communication unit 294, and/or the like) may transmit, to the AMF device, a message to indicate that the downlink transmissions have been suspended based at least in part on the UPF device acknowledging the instruction to buffer or discard the subsequent downlink data that relates to the one or more QoS flow or DRB identifiers, as described above.

Process 1200 may include additional aspects, such as any single aspect or any combination of aspects described below and/or in connection with one or more other processes described elsewhere herein.

In a first aspect, the SMF may maintain a UE context associated with the one or more QoS flow or DRB identifiers while the downlink transmissions are suspended and maintain a signaling connection with one or more radio access network nodes serving the UE while the downlink transmissions are suspended.

In a second aspect, alone or in combination with the first aspect, the SMF may receive, from the AMF device, a request to resume downlink transmissions that relate to the one or more QoS flow or DRB identifiers; transmit, to the UPF device, a user plane resume indication instructing the UPF device to resume the downlink transmissions that relate to the one or more QoS flow or DRB identifiers; and transmit, to the AMF device, an acknowledgement message indicating that the downlink transmissions that relate to the one or more QoS flow or DRB identifiers have been resumed based at least in part on the UPF device acknowledging the user plane resume indication.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
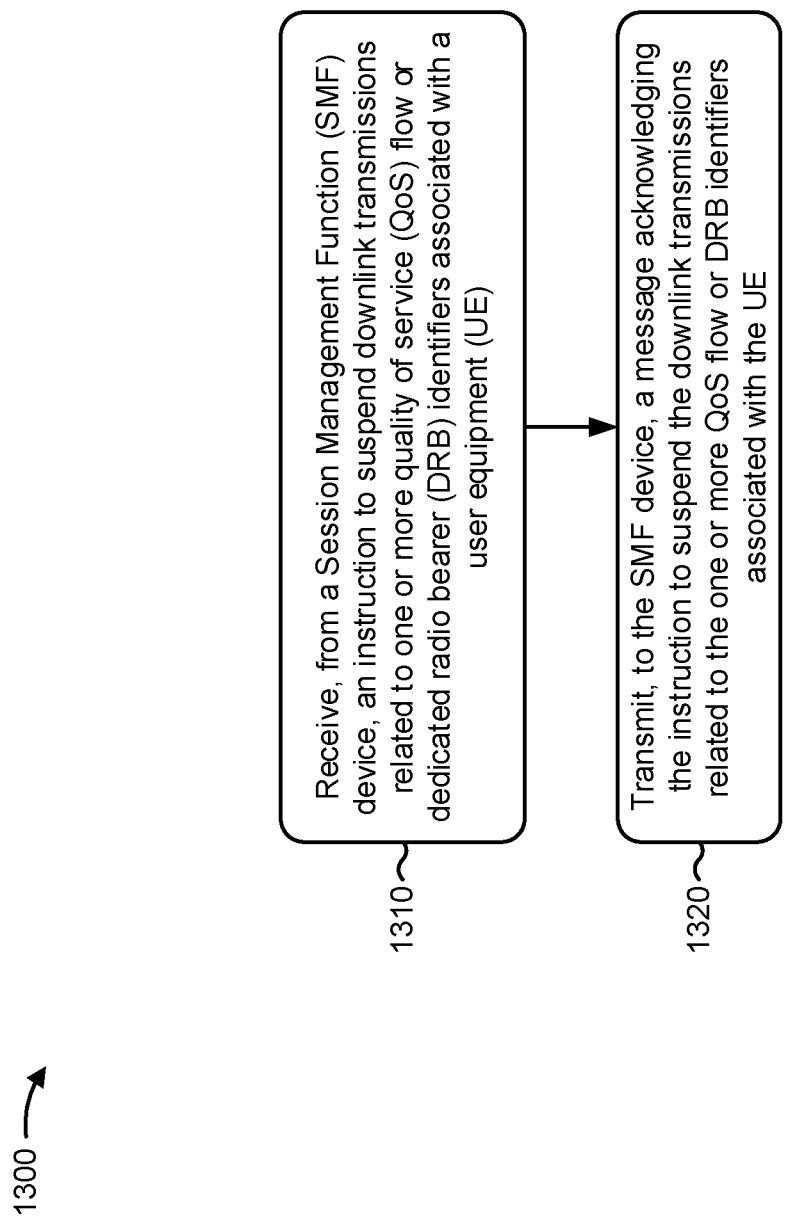

FIG. 13 is a diagram illustrating an example process 1300 performed, for example, by a core network node, in accordance with various aspects of the present disclosure. Example process 1300 is an example where a core network node (e.g., UPF 418 and/or the like) performs operations associated with an RRC layer based suspend and resume procedure.

As shown in FIG. 13, in some aspects, process 1300 may include receiving, from a SMF device, an instruction to suspend downlink transmissions related to one or more QoS flow or DRB identifiers associated with a UE (block 1310). For example, the UPF (e.g., using controller/processor 290, memory 292, communication unit 294, and/or the like) may receive, from an SMF device, an instruction to suspend downlink transmissions related to one or more QoS flow or DRB identifiers associated with a UE, as described above.

As further shown in FIG. 13, in some aspects, process 1300 may include transmitting, to the SMF device, a message acknowledging the instruction to suspend the downlink transmissions related to the one or more QoS flow or DRB identifiers associated with the UE (block 1320). For example, the UPF (e.g., using controller/processor 290, memory 292, communication unit 294, and/or the like) may transmit, to the SMF device, a message acknowledging the instruction to suspend the downlink transmissions related to the one or more QoS flow or DRB identifiers associated with the UE, as described above.

Process 1300 may include additional aspects, such as any single aspect or any combination of aspects described below and/or in connection with one or more other processes described elsewhere herein.

In a first aspect, the UPF may buffer or discard received downlink data associated with the UE based at least in part on the instruction received from the SMF device.

In a second aspect, alone or in combination with the first aspect, the UPF may maintain a context associated with the UE while the one or more downlink transmissions are suspended, and maintain a tunnel associated with a user plane connection for the UE with one or more radio access network nodes serving the UE while the one or more downlink transmissions are suspended.

In a third aspect, alone or in combination with one or more of the first and second aspects, the UPF may receive, from the SMF device, a request to resume the downlink transmissions related to the one or more QoS flow or DRB identifiers associated with the UE and transmit, to the SMF device, a message to indicate that the downlink transmissions related to the one or more QoS flow or DRB identifiers associated with the UE are to be resumed.

In a fourth aspect, alone or in combination with one or more of the first through third aspects, the UPF may transmit downlink data associated with the UE to one or more radio access network nodes serving the UE via a network tunnel based at least in part on the request to resume the downlink transmissions, and the downlink data transmitted via the network tunnel may include one or more of downlink data that was buffered while the one or more downlink transmissions were suspended or downlink data received subsequent to the request to resume the downlink transmissions.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a radio access network (RAN) node, comprising:
   receiving, from a user equipment (UE) served by the RAN node, a request to suspend downlink transmissions related to a subscription associated with a first subscriber identity module (SIM) of the UE, the request informing the RAN node that the UE will be transitioning service to a wireless network serving a second SIM of the UE wherein the request to suspend the downlink transmissions includes an RRC UE assistance information message;
   transmitting, from the RAN node to a core network node, a user plane suspend message based at least in part on the request to suspend the downlink transmissions, wherein the user plane suspend message includes one or more quality of service (QOS) flows or dedicated radio bearer (DRB) identifiers associated with the first SIM of the UE, wherein the request to suspend the downlink transmissions indicates the one or more QoS flows or DRB identifiers associated with the first SIM of the UE; and
   transmitting, to the UE, a release message to enable the UE to transition the service to the wireless network serving the second SIM of the UE and to transition the UE to an inactive mode on the RAN based at least in part on a response message from the core network node indicating that the downlink transmissions related to the subscription of the UE have been suspended.

2. The method of claim 1, wherein the request to suspend the downlink transmissions includes one or more of a radio resource control (RRC) connection suspend message.

3. The method of claim 1, further comprising transmitting, to the UE, a paging message that is related to traffic activity associated with the subscription associated with the first SIM of the UE, and that is unrelated to the one or more QoS flows or DRB identifiers associated with the first SIM of the UE.

4. The method of claim 1, further comprising:
   receiving, from the UE, a connection resume request that includes a user plane resume indication;
   transmitting, to the core network node, a request to resume the downlink transmissions related to the subscription associated with the first SIM of the UE based at least in part on the connection resume request; and
   transmitting, to the UE, a radio resource control (RRC) resume message indicating that the downlink transmissions related to the subscription associated with the first SIM of the UE have been resumed based at least in part on a message from the core network node acknowledging the request to resume the downlink transmissions.

5. The method of claim 4, further comprising:
receiving, from the UE, an RRC resume complete message to acknowledge the RRC resume message; and
forwarding, to the UE, the downlink transmissions related to the subscription associated with the first SIM of the UE, wherein the downlink transmissions are received from a user plane function device.

6. The method of claim 4, wherein the request to resume the downlink transmissions includes one or more of a user plane resume message based on a local context associated with the UE or a path switch request message based on a context retrieved from a most recent base station that served the UE.

7. A method of wireless communication performed by an access and mobility management function (AMF) device, comprising:
receiving, from a radio access network (RAN) node, a user plane suspend message for a first subscriber identity module (SIM) of a user equipment (UE) served by the RAN node, wherein the user plane suspend message includes one or more quality of service (QOS) flows or dedicated radio bearer (DRB) identifiers associated with the first SIM of the UE, wherein the user plane suspend message indicates the one or more QoS flows or DRB identifiers associated with the first SIM of the UE, and wherein the user plane suspend message is based on a request to suspend downlink transmissions that includes an RRC UE assistance information message;
forwarding information contained in the user plane suspend message to one or more session management function (SMF) devices serving the first SIM of the UE; and
transmitting, to the RAN node, a user plane suspend response message indicating that downlink transmissions related to a subscription associated with the first SIM of the UE have been suspended based at least in part on a downlink data suspend response message received from the one or more SMF devices.

8. The method of claim 7, wherein the information forwarded to the one or more SMF devices includes the one or more quality of service (QOS) flows or the dedicated radio bearer (DRB) identifiers associated with the first SIM of the UE that are to be suspended.

9. The method of claim 8, further comprising suspending paging related to the one or more QoS flows or DRB identifiers associated with the first SIM of the UE.

10. The method of claim 7, further comprising:
receiving, from the RAN node, a request to resume the downlink transmissions related to the subscription associated with the first SIM of the UE;
forwarding information contained in the request to resume the downlink transmissions to the one or more SMF devices; and
transmitting, to the RAN node, an acknowledgement message indicating that the downlink transmissions related to the subscription associated with the first SIM of the UE have been resumed based at least in part on a message from the one or more SMF devices.

11. The method of claim 10, wherein the acknowledgement message includes one or more of a user plane resume acknowledgement message or a path switch acknowledgement message with a user plane resume acknowledgement indicator.

12. A method of wireless communication performed by a session management function (SMF) device, comprising:
receiving, from an access and mobility management function (AMF) device, a request to suspend downlink transmissions for a user equipment (UE), wherein the request includes one or more quality of service (QOS) flows or dedicated radio bearer (DRB) identifiers associated with a first subscriber identity module (SIM) of the UE that are to be suspended, and wherein the request to suspend the downlink transmissions includes an RRC UE assistance information message;
transmitting, to a user plane function (UPF) device, an instruction to buffer or discard subsequent downlink data that relates to the one or more QoS flows or DRB identifiers associated with the first SIM of the UE based at least in part on one or more policies; and
transmitting, to the AMF device, a message to indicate that the downlink transmissions associated with the first SIM of the UE have been suspended based at least in part on the UPF device acknowledging the instruction to buffer or discard the subsequent downlink data that relates to the one or more QoS flows or DRB identifiers associated with the first SIM of the UE.

13. The method of claim 12, further comprising:
maintaining a UE context associated with the one or more QoS flows or DRB identifiers associated with the first SIM of the UE while the downlink transmissions associated with the first SIM of the UE are suspended; and
maintaining a signaling connection with one or more radio access network nodes serving the UE while the downlink transmissions associated with the first SIM of the UE are suspended.

14. The method of claim 12, further comprising:
receiving, from the AMF device, a request to resume downlink transmissions that relate to the one or more QoS flows or DRB identifiers associated with the first SIM of the UE;
transmitting, to the UPF device, a user plane resume indication instructing the UPF device to resume the downlink transmissions that relate to the one or more QoS flows or DRB identifiers associated with the first SIM of the UE; and
transmitting, to the AMF device, an acknowledgement message indicating that the downlink transmissions that relate to the one or more QoS flows or DRB identifiers associated with the first SIM of the UE have been resumed based at least in part on the UPF device acknowledging the user plane resume indication.

15. A method of wireless communication performed by a user plane function (UPF) device, comprising:
receiving, from a session management function (SMF) device, an instruction to suspend downlink transmissions related to one or more quality of service (QOS) flows or dedicated radio bearer (DRB) identifiers associated with a first subscriber identity module (SIM) of a user equipment (UE), wherein the instruction to suspend downlink transmissions is based on a request to suspend downlink transmissions that includes an RRC UE assistance information message; and
transmitting, to the SMF device, a message acknowledging the instruction to suspend the downlink transmissions related to the one or more QoS flows or DRB identifiers associated with first SIM of the UE.

16. The method of claim 15, further comprising buffering or discarding received downlink data associated with first SIM of the UE based at least in part on the instruction received from the SMF device.

17. The method of claim 15, further comprising:
maintaining a context associated with the UE while the one or more downlink transmissions associated with the first SIM of the UE are suspended; and
maintaining a tunnel associated with a user plane connection for the UE with one or more radio access network nodes serving the UE while the one or more downlink transmissions associated with the first SIM of the UE are suspended.

18. The method of claim 15, further comprising:
receiving, from the SMF device, a request to resume the downlink transmissions related to the one or more QoS flows or DRB identifiers associated with first SIM of the UE; and
transmitting, to the SMF device, a message to indicate that the downlink transmissions related to the one or more QoS flows or DRB identifiers associated with first SIM of the UE are to be resumed.

19. The method of claim 18, further comprising:
transmitting downlink data associated with the UE to one or more radio access network nodes serving the UE via a network tunnel based at least in part on the request to resume the downlink transmissions, wherein the downlink data transmitted via the network tunnel includes one or more of downlink data that was buffered while the one or more downlink transmissions were suspended or downlink data received subsequent to the request to resume the downlink transmissions.

20. A radio access network (RAN) node for wireless communication, comprising:
one or more memories; and
one or more processors, coupled to the one or more memories, the one or more processors configured to:
receive, from a user equipment (UE) served by the RAN node, a request to suspend downlink transmissions related to a subscription associated with a first subscriber identity module (SIM) of the UE, the request informing the RAN node that the UE will be transitioning service to a wireless network serving a second SIM of the UE, wherein the request to suspend the downlink transmissions includes an RRC UE assistance information message;
transmit, to a core network node, a user plane suspend message based at least in part on the request to suspend the downlink transmissions, wherein the user plane suspend message includes one or more quality of service (QOS) flows or dedicated radio bearer (DRB) identifiers associated with the first SIM of the UE, wherein the request to suspend the downlink transmissions indicates the one or more QoS flows or DRB identifiers associated with the first SIM of the UE; and
transmit, to the UE, a release message to enable the UE to transition the service to the wireless network serving the second SIM of the UE and to transition the UE to an inactive mode on the RAN based at least in part on a response message from the core network node indicating that the downlink transmissions related to the subscription associated with the first SIM of the UE have been suspended.

21. The RAN node of claim 20, wherein the request to suspend the downlink transmissions includes a radio resource control (RRC) connection suspend message.

22. The RAN node of claim 20, wherein the one or more processors are further configured to:
transmit, to the UE, a paging message that is related to traffic activity associated with the subscription of the UE, and that is unrelated to the one or more QoS flows or DRB identifiers associated with the first SIM of the UE.

23. The RAN node of claim 20, wherein the one or more processors are further configured to:
receive, from the UE, a connection resume request that includes a user plane resume indication;
transmit, to the core network node, a request to resume the downlink transmissions related to the subscription associated with the first SIM of the UE based at least in part on the connection resume request; and
transmit, to the UE, a radio resource control (RRC) resume message indicating that the downlink transmissions related to the subscription associated with the first SIM of the UE have been resumed based at least in part on a message from the core network node acknowledging the request to resume the downlink transmissions.

24. The RAN node of claim 23, wherein the one or more processors are further configured to:
receive, from the UE, an RRC resume complete message to acknowledge the RRC resume message; and
forward, to the UE, the downlink transmissions related to the subscription associated with the first SIM of the UE, wherein the downlink transmissions are received from a user plane function device.

25. The RAN node of claim 23, wherein the request to resume the downlink transmissions includes one or more of a user plane resume message based on a local context associated with the UE or a path switch request message based on a context retrieved from a most recent base station that served the UE.

* * * * *